US006266610B1

(12) United States Patent
Schultz et al.

(10) Patent No.: US 6,266,610 B1
(45) Date of Patent: Jul. 24, 2001

(54) MULTI-DIMENSIONAL ROUTE OPTIMIZER

(75) Inventors: Robert L. Schultz, Edina; Donald A. Shaner, Shoreview, both of MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/223,846

(22) Filed: Dec. 31, 1998

(51) Int. Cl.$^7$ .................................................. G01C 21/00
(52) U.S. Cl. ............................................ 701/201; 701/209
(58) Field of Search ..................................... 701/201, 202, 701/209, 211, 204

(56) References Cited

U.S. PATENT DOCUMENTS

| 3,566,060 | | 2/1971 | Phillips et al. ........................ 200/83 |
| 4,774,670 | | 9/1988 | Palmieri .............................. 364/446 |
| 4,812,990 | * | 3/1989 | Adams et al. ........................... 701/3 |
| 5,041,982 | * | 8/1991 | Rathnam ............................. 701/200 |
| 5,051,910 | | 9/1991 | Liden .................................. 364/446 |
| 5,086,396 | * | 2/1992 | Waruszewski, Jr. .................. 701/221 |
| 5,255,190 | | 10/1993 | Sznaider ............................. 364/420 |
| 5,265,024 | * | 11/1993 | Crabill et al. ....................... 701/200 |
| 5,408,413 | * | 4/1995 | Gonser et al. ....................... 701/204 |
| 5,445,021 | | 8/1995 | Cattoen et al. ..................... 73/178 R |
| 5,457,634 | * | 10/1995 | Chakravarty ............................. 701/3 |
| 5,521,826 | * | 5/1996 | Matsumoto .......................... 701/208 |
| 5,574,647 | * | 11/1996 | Liden ..................................... 701/8 |
| 5,615,118 | | 3/1997 | Frank . |
| 5,878,368 | * | 3/1999 | DeGraaf .............................. 701/209 |
| 5,884,223 | * | 3/1999 | Tognazzini .......................... 701/301 |
| 5,899,955 | * | 5/1999 | Yagyu et al. ........................ 701/209 |
| 5,916,299 | * | 6/1999 | Poppen ............................... 701/202 |
| 6,005,494 | * | 12/1999 | Schramm ............................. 340/995 |
| 6,085,147 | * | 7/2000 | Myers ................................. 701/209 |
| 6,112,141 | * | 8/2000 | Briffe et al. ........................... 701/14 |

FOREIGN PATENT DOCUMENTS

| 2138092 | 6/1995 | (CA) . |
| 3126891 | 1/1983 | (DE) . |
| 19621437 | 12/1996 | (DE) . |
| 2723219A | 2/1996 | (FR) . |
| 8061974 | 3/1996 | (JP) . |
| 8313290 | 11/1996 | (JP) . |
| 8321000 | 12/1996 | (JP) . |
| 9201905A | 2/1992 | (WO) . |
| 9518498 | 7/1995 | (WO) . |
| 9728423 | 8/1997 | (WO) . |
| 97/47947 | * 12/1997 | (WO) . |

OTHER PUBLICATIONS

Aho, A.V., et al., "Date Structures And Algorithms—Section 6.3 The Single Shortest Path", Addison—Wesley Publishing Company, Menlo Park, California, (1983).

(List continued on next page.)

Primary Examiner—Michael J. Zanelli
(74) Attorney, Agent, or Firm—John G. Shudy, Jr.

(57) ABSTRACT

A system and method of optimizing a multi-dimensional route, such as an aircraft flight path, using a lateral path optimizer and a vertical path optimizer. The lateral path is determined by searching for a path among nodes that minimizes a cost function. The vertical path is determined by reference to pre-determined data generated as a function of aircraft parameters and wind speed. The optimized route is filtered as it is being generated. The optimized route is not limited by pre-determined waypoints.

76 Claims, 24 Drawing Sheets

OTHER PUBLICATIONS

Bellman, R., "On a Routing Problem", *Quarterly of Applied Mathematics 16* (1) : 87–90, (1958).

Bellman, R.E., et al., "Applied Dynamic Programming—Section 24—A Routing Problem", *In Applied Dynamic Programming*: 229–231, Princeton University Press, Princeton, New Jersey, (1962).

Denton, R.V., et al., "Applications of Autopath Technology to Terrain Obstacle Avoidance", Naecon Conference Proceedings: 1373–1376, (1982).

Denton, R.V., et al., "Optimal TF/TA Route Planning Using Digital Terrain Elevation Data", CH1839-0/83/000-0061 1983 *IEEE* : 14.3.1–14.3.6, (1983).

Johnson, D.B., "Efficient Algorithms for Shortest Paths in a Sparse Network", *Journal of the ACM 24* (1) : 1–13, Mar. 1977, 1–13, (1977).

Kriegel, E.K., et al., "Technology and Standards for a Common Air Mission Planner, Air Vehicle Mission Control and Management", AGARD Conference Proceedings 504, 1992: 19–1 through 19–17, MITRE Corporation, Burlington Road Bedford, Massachusetts 01730 USA, (1992).

Schultz, R.L., "Three Dimensional Trajectory Optimization For Aircraft", *AIAA Journal of Guidance, Control, and Dynamics* ; vol. 13; No. 6; Nov.–Dec. 1990: 936–943, (1990).

Schultz, R.L., et al., "Aircraft Performance Optimization", *Journal of Aircraft* ; vol. 9; No. 2; Feb. 1972: 108–114, (1972).

* cited by examiner

WIND FIELD DEPICTION (WINDS OVER 50 KNOTS)

Fig.14  DYNAMIC PROGRAMMING SOLUTION

GEOMETRY FOR ROUTE PLANNING

ALGORITHM GEOMETRY

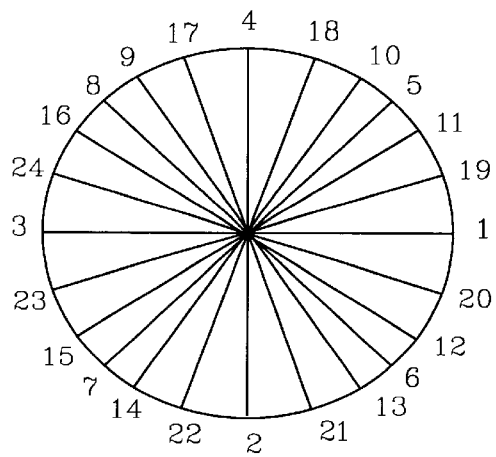
Fig.17A
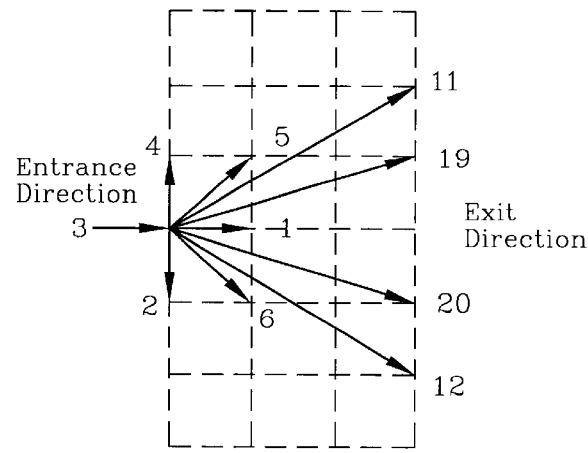
Fig.17B
Directions Matrix
aexit(i,j)
Approch Sement=i     i=1,24
Departure Segment=j  J=1,9
| In i | Out j | | | | | | | | |
|---|---|---|---|---|---|---|---|---|---|
| 1 | 3 | 7 | 8 | 15 | 16 | 23 | 24 | 4 | 2 |
| 2 | 4 | 8 | 5 | 9 | 10 | 17 | 18 | 3 | 1 |
| 3 | 1 | 5 | 6 | 11 | 12 | 19 | 20 | 4 | 2 |
| 4 | 2 | 6 | 7 | 13 | 14 | 21 | 22 | 1 | 3 |
| 5 | 7 | 2 | 3 | 14 | 15 | 22 | 23 | 6 | 8 |
| 6 | 8 | 3 | 4 | 9 | 16 | 24 | 17 | 7 | 5 |
| 7 | 5 | 4 | 1 | 10 | 11 | 18 | 19 | 8 | 6 |
| 8 | 6 | 1 | 2 | 12 | 13 | 20 | 21 | 5 | 7 |
| 9 | 13 | 6 | 12 | 20 | 21 | 2 | 22 | 11 | 15 |
| 10 | 14 | 22 | 2 | 21 | 7 | 15 | 23 | 12 | 16 |
| 11 | 15 | 7 | 14 | 22 | 23 | 3 | 24 | 9 | 13 |
| 12 | 16 | 21 | 3 | 23 | 8 | 9 | 17 | 10 | 14 |
| 13 | 9 | 24 | 16 | 8 | 17 | 4 | 18 | 11 | 15 |
| 14 | 10 | 17 | 4 | 18 | 5 | 11 | 19 | 12 | 16 |
| 15 | 11 | 18 | 10 | 5 | 19 | 1 | 20 | 9 | 13 |
| 16 | 12 | 19 | 1 | 20 | 6 | 13 | 21 | 10 | 14 |
| 17 | 21 | 12 | 6 | 12 | 2 | 22 | 14 | 19 | 23 |
| 18 | 22 | 13 | 21 | 2 | 14 | 7 | 15 | 20 | 24 |
| 19 | 23 | 14 | 7 | 15 | 3 | 24 | 16 | 17 | 21 |
| 20 | 24 | 15 | 23 | 3 | 16 | 8 | 9 | 18 | 22 |
| 21 | 17 | 16 | 8 | 9 | 4 | 18 | 10 | 19 | 23 |
| 22 | 18 | 9 | 17 | 4 | 10 | 5 | 11 | 20 | 24 |
| 23 | 19 | 10 | 5 | 11 | 1 | 20 | 12 | 17 | 21 |
| 24 | 20 | 11 | 19 | 1 | 13 | 12 | 6 | 18 | 22 |
a) Exit Directions to Entry Direction Mapping
Fig.17C
Steps
| Exit | Dx(i) | Dy(i) |
|---|---|---|
| 1 | +1 | 0 |
| 2 | 0 | −1 |
| 3 | −1 | 0 |
| 4 | 0 | +1 |
| 5 | +1 | +1 |
| 6 | +1 | −1 |
| 7 | −1 | −1 |
| 8 | −1 | +1 |
| 9 | −2 | +3 |
| 10 | +2 | +3 |
| 11 | +3 | +2 |
| 12 | +3 | −2 |
| 13 | +2 | −3 |
| 14 | −2 | −3 |
| 15 | −3 | −2 |
| 16 | −3 | +3 |
| 17 | −1 | +2 |
| 18 | +1 | +3 |
| 19 | +3 | +1 |
| 20 | +3 | −1 |
| 21 | +3 | −3 |
| 22 | −1 | −3 |
| 23 | −3 | −1 |
| 24 | −3 | +1 |
b) Step Increment for Each exit Direction
Fig.17D
iomp(i)
i=1,24
| Exit i | In iomp(i) |
|---|---|
| 1 | 3 |
| 2 | 4 |
| 3 | 1 |
| 4 | 2 |
| 5 | 7 |
| 6 | 8 |
| 7 | 5 |
| 8 | 6 |
| 9 | 13 |
| 10 | 14 |
| 11 | 15 |
| 12 | 16 |
| 13 | 9 |
| 14 | 10 |
| 15 | 11 |
| 16 | 12 |
| 17 | 21 |
| 18 | 22 |
| 19 | 23 |
| 20 | 24 |
| 21 | 17 |
| 22 | 18 |
| 23 | 19 |
| 24 | 20 |
c) Exit to Entrance Direction
Fig.17E

LENGTHENED PATHS AROUND A GREAT CIRCLE

VERTICAL PATH REGIMES

QUNTIZATION EFFECT

NUMBER OF DIRECTIONS USED TO
REDUCE QUANTIZATION AMBIGUITY

TRAJECTORY FILTERING

EFFECT OF FILTER ON ROUTE SELECTION

MULTI-DIMENSIONAL ROUTE OPTIMIZER

TECHNICAL FIELD

Disclosed is a method and system for optimizing the path of a vehicle in multi-dimensional space. In particular, aircraft flight path optimization is disclosed.

COPYRIGHT NOTICE AND PERMISSION

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. The following notice applies to the software and data as described below and in the drawings hereto: Copyright© 1998, Honeywell, Inc., All Rights Reserved.

BACKGROUND ART

For safety and efficiency reasons, aircraft routing is commonly along predetermined air routes or great circle routes. Predetermined air routes are often aligned with ground-based navigational aids. In some cases, air routes circumvent geographical regions. Great circle routes, on the other hand, promise shorter flight distances.

Weather affects both the efficiency and the safety of a particular flight. Aircraft efficiency improves with favorable winds. In suitable tailwinds, ground speed increases and fuel consumption drops. Reduced fuel consumption often means that additional revenue-generating payload can be carried. Increased ground speed means that flight times are reduced resulting in operational cost savings.

Similarly, hazardous weather can impose a wide variety of costs on aircraft operations. Such costs can range from an uncomfortable ride for passengers at the low end, to structural damage, and even loss of aircraft and lives, at the other extreme. Aircraft operators typically go to great length to avoid hazardous weather.

In addition, certain geographical and political regions are covered by restricted airspace. Certain regions are preferably avoided by aircraft because costly over flight fees may be imposed.

Achieving a desired arrival time is important because it allows the operator to more accurately schedule flights and enjoy greater operational efficiency. Aircraft operating on pre-determined air routes or great circle routes may be forced to make costly adjustments to airspeed in order to meet scheduling requirements.

Typical flight path routing fails to consider operational costs associated with atmospheric phenomena, hazardous weather avoidance, region avoidance and arrival time constraints. There exists a need for a system that addresses these shortcomings.

SUMMARY

The invention determines an optimized route between a starting location and a destination by minimizing a cost function. The cost function is based on factors including fuel consumed, time, over-flight fees and penalty fees associated with restricted airspace. The invention implements an optimization algorithm for determining both lateral and vertical planes. The routes may be displayed over a global map with data including overlays depicting wind fields and restricted regions. Global databases may provide the data for wind conditions, weather, and temperature profiles.

In one embodiment, the invention determines the lateral path using a dynamic programming algorithm. In one embodiment, the algorithm operates by constructing a rectangular grid that overlays both the origin and destination location. Determination of the optimal lateral path proceeds in stages beginning with the initial, or origin location. At each stage, the algorithm examines the transition cost from the current node to each of a set of possible nodes. Optimization of the transition costs for each stage proceeds until the destination location has been reached.

The vertical path is determined using calculus of variations methods. Calculus of variations methods is a generalized optimization technique and is known in the art. In one embodiment, the vertical path is based on predetermined data stored as a function of parameters including wind speed, aircraft weight and cost index.

A filter is used to smooth the route while it is being generated. Filtering improves the quality of the route by minimizing the effects of quantization. Quantization of the calculation may result in an optimal route that requires excessive heading and altitude changes.

The user can select from among various routing choices. For example, wind-optimization routing results in substantially maximizing the favorable effects of tailwinds and substantially minimizing the detrimental effects of headwinds. Region avoidance routing provides an optimal route that circumvents specified geographical regions. Similarly, over-flight routing provides an optimal route that considers over-flight costs in calculating a route. Required time of arrival routing provides an optimal route that achieves a desired arrival time.

BRIEF DESCRIPTION OF THE DRAWINGS

In the drawings, like numerals describe substantially similar components throughout the several views.

FIG. 17A is an illustration of one embodiment of a segment numbering system.

FIG. 17B is an illustration of departure segments, corresponding to FIG. 17A, based on an approach segment.

FIG. 17C is a tabular representation of the data of FIG. 17A.

FIG. 17D is a tabular representation of step increments as a function of departure segments.

FIG. 17E is a tabular representation of reciprocal segments.

DETAILED DESCRIPTION

In the following description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the scope of the present invention. The following description is, therefore, not to be taken in a limited sense, and the scope of the present invention is defined by the appended claims.

The terms path, route, and trajectory are used interchangeably. In addition, a node represents a physical position in space corresponding to latitude, longitude and altitude (or other such coordinates). The term "location" as used herein, is reserved generally for the node associated with the origin or destination and corresponds to the beginning and ending, respectively, of a particular route.

The description is divided into multiple sections. The first section provides an overview and an example of route optimization. The second section describes one embodiment of lateral path optimization and application to flight path optimization and includes information showing possible results. The third section describes one embodiment of vertical path optimization as applied to various flight regimes. The fourth section describes one embodiment of path filtering and quantization. The fifth section describes an embodiment of a computer system adapted for implementing the invention.

Section 1

The invention relates to determining optimal path routing. In one embodiment, the horizontal, or lateral, path is optimized by an iterative process of evaluating a plurality of alternative routes. As explained subsequently, the alternative routes are defined by the interconnections between nodes.

In one embodiment, the position of the nodes is arbitrary. In another embodiment, the nodes are positioned at predetermined points arranged in geometric relation to the position of the origin and destination locations. In other words, the nodes may be distributed uniformly and arranged in a geometric grid pattern. Alternatively, the position of subsequent nodes may be defined in relation to the position of previous nodes. In other words, the nodes may be positioned, or defined, concurrent with the development of an optimized route, thereby, eliminating the requirement of a grid.

In another embodiment, the nodes may be arranged in concentric segments of semi-circles. For example, the first set of nodes may consist of the set of points lying on a one mile radius spaced at 10 degree arcs, along a 180 degree semi-circle. In this embodiment, subsequent sets of nodes may be defined at subsequent arcs projecting radially from the nodes lying on the optimized route.

Figure 1:
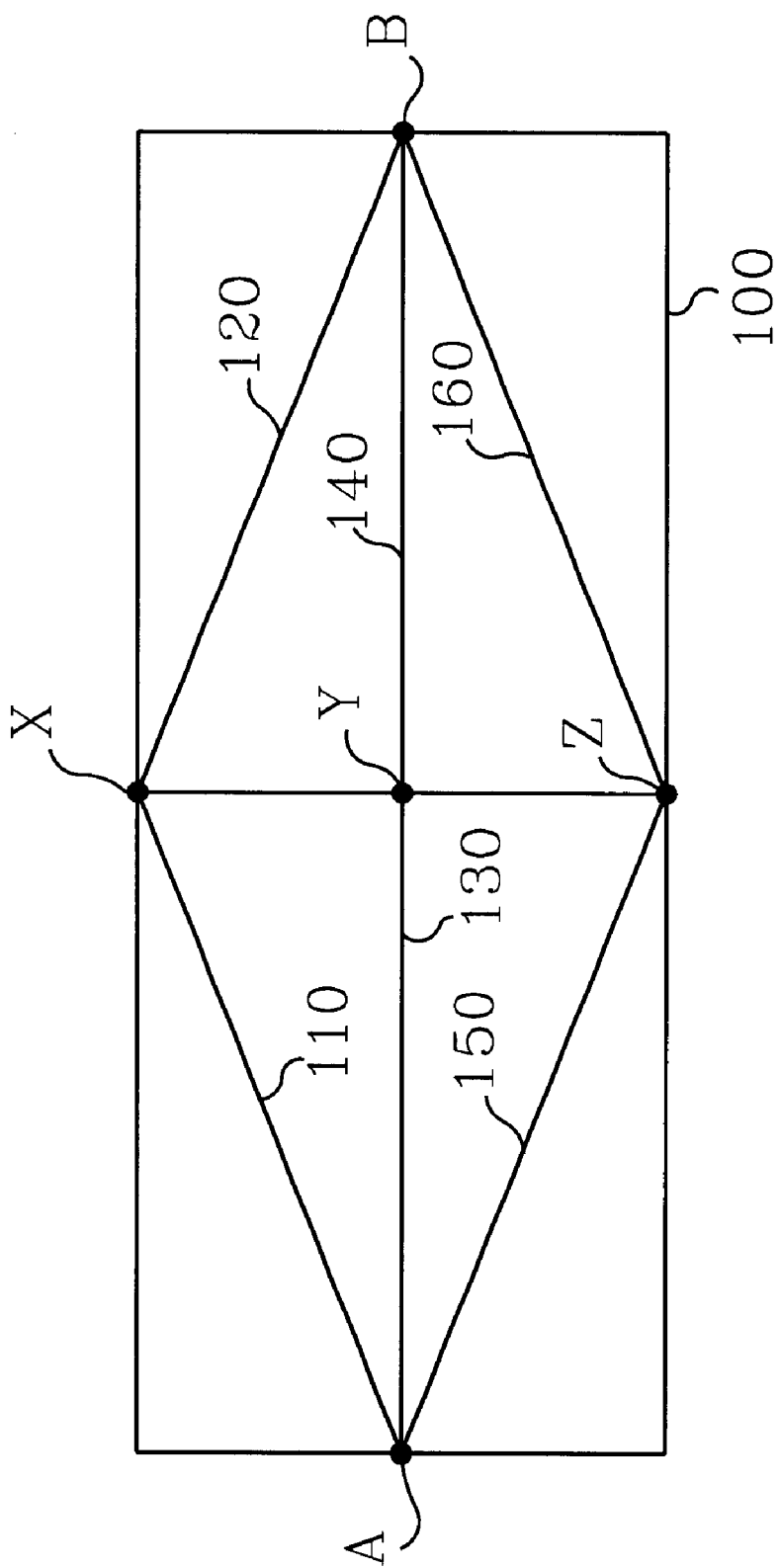
FIG. 1 is an example of a routing scenario.

FIG. 1 depicts an example of traveling from location A to location B. Grid 100 encompasses the space between the two locations and is of rectangular configuration. For this example, travel can proceed along any one of three possible paths where each path is made up of segments. As used herein, "segment" refers to a portion of the flight path between nodes and the term "segment" may be further modified as in "approach segment" and "departure segment" wherein the directional term is with respect to a particular node under consideration. Referring again to FIG. 1, from location A, the available routes are segments 110, 130, and 150, leading to nodes marked x, y, and z respectively. As used herein, the term "stage" refers to the transition from one node to a group of nodes. At the next stage, just as at the first stage, travel can proceed along any one of three possible segments. In this example, the three available segments in the group are 120, 140 and 160. Therefore, the path options can be denoted as A-x-B, A-y-B and A-z-B.

A transit cost can be calculated for arriving at node x, node y, and node z. Similarly, a cost can be determined for each possible travel path that finishes at location B. Assume that arrival at node x carries a cost of $1.00, y is $2.00 and z is $3.00 and arrival at location B adds another $1.00. Consequently, path A-x-B will cost $2.00, path A-y-B is $3.00, and path A-z-B is $4.00. It will be seen that path A-x-B carries the least cost.

Factors that explain the variations in costs associated with arriving at node x, node y, and node z are familiar to aircraft operators. For example, node x may be enjoying favorable tailwinds, node y may be experiencing a turbulent weather and node z may be associated with burdensome over-fly costs.

Figure 2:
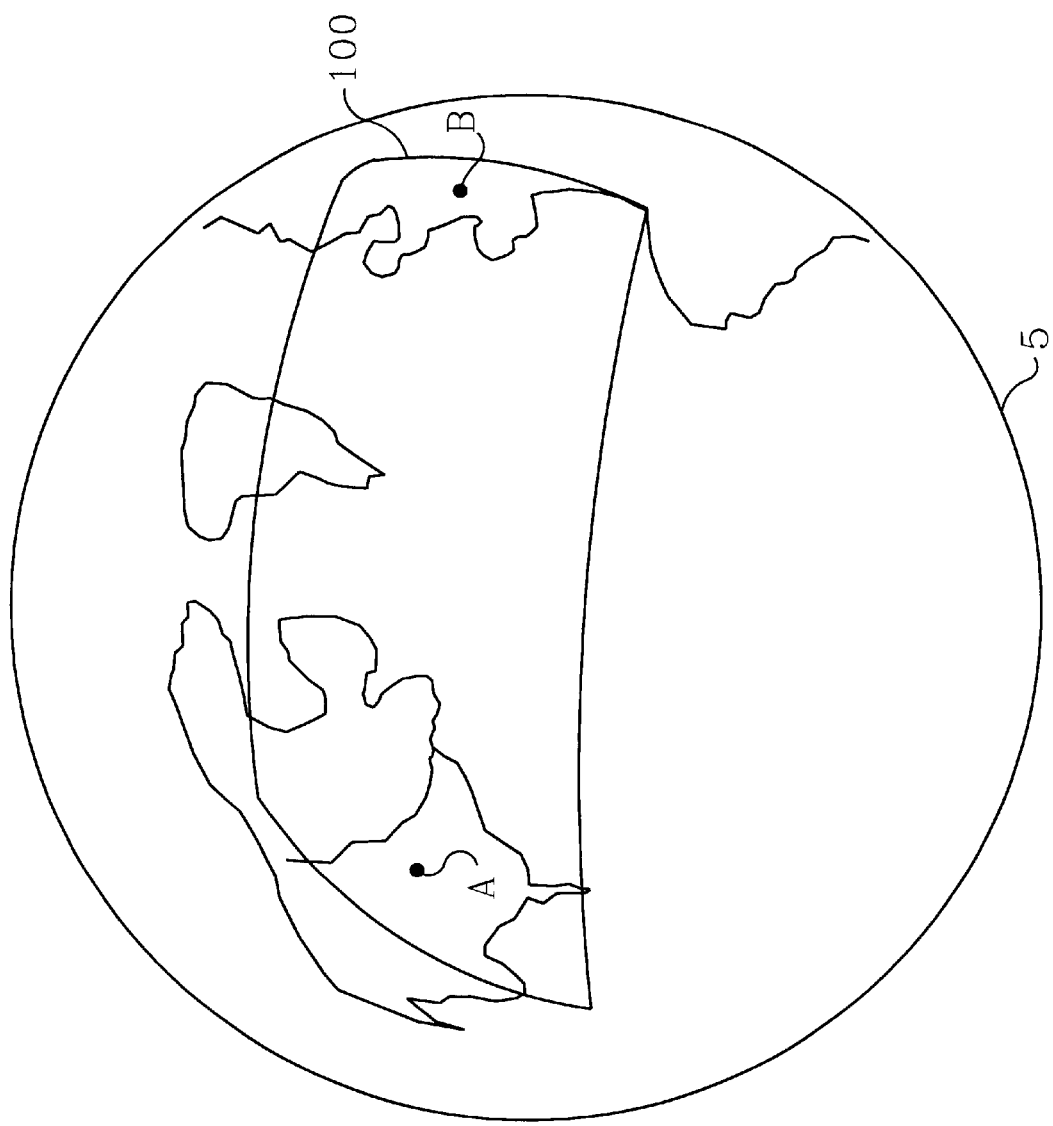
FIG. 2 is a global view illustrating a rectangular state space search region.

In air travel, the simple grid of FIG. 1 is replaced by a larger grid having many nodes. In the context of the invention, the grid is sometimes referred to as a state space region, an example of which is seen in FIG. 2. In FIG. 2, state space region 100 is overlaid atop global map 5. Flight is contemplated between location A and location B.

Route optimizing consists of identifying the path that yields the desired results. Desired results might include, but are not limited to, a route that requires the least fuel, least travel time, and the avoidance of geographical and political regions. In some situations it may be desirable to select a route that satisfies a required time of arrival. In addition, desired results might consist of various combinations of these, or other, objectives.

Figure 3:
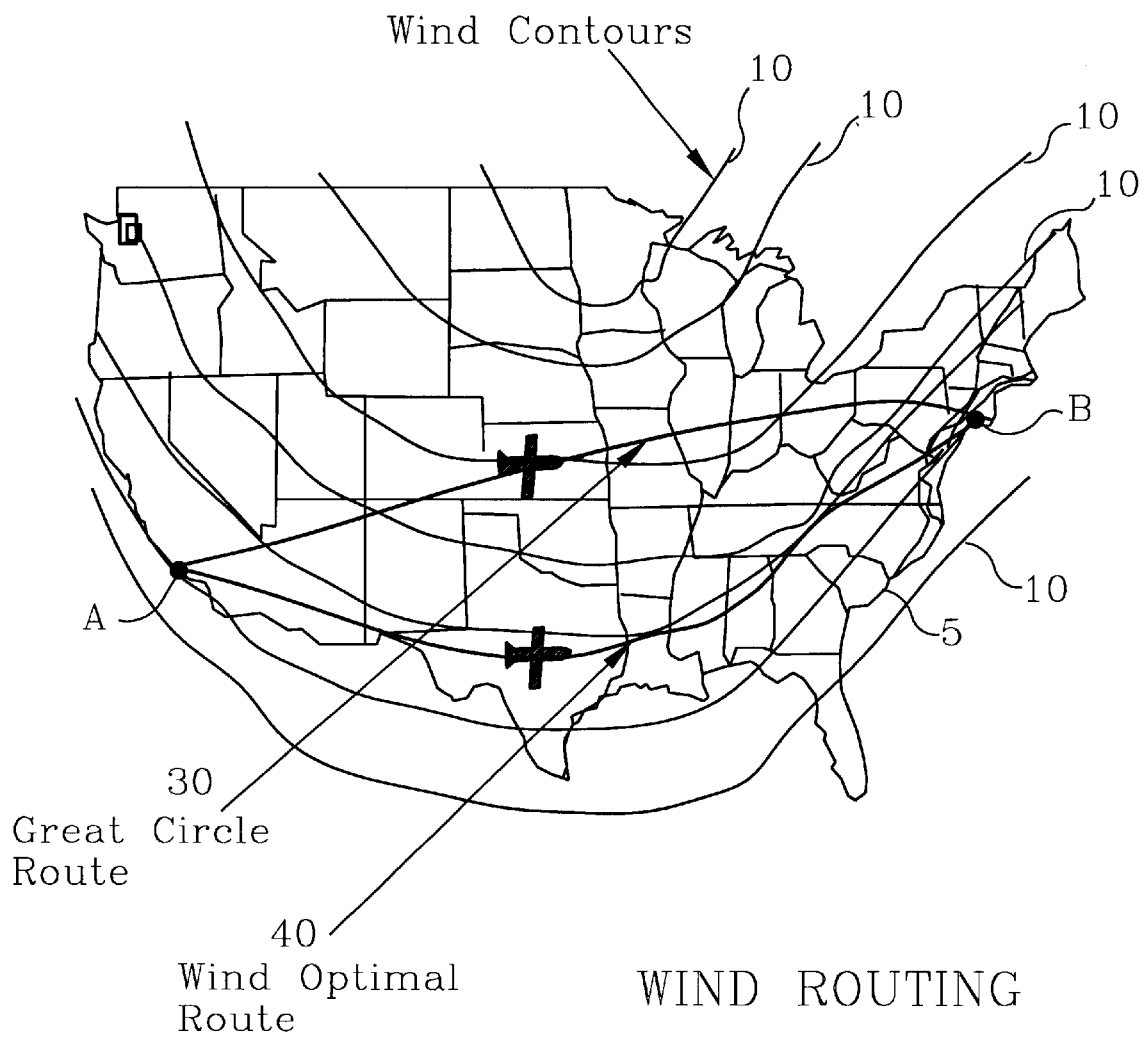
FIG. 3 is a map showing wind contours, a great circle route and a wind optimal route.

FIG. 3 illustrates the effects of wind optimization for a domestic flight across the United States. The figure depicts a generally eastbound flight between location A (Los Angeles) and location B (Washington D.C.). Wind contour lines 10, also generally eastbound, overlay the US map 5 and depict the wind velocity at a particular flight level. Great circle route 30 and wind optimal route 40 are marked on map 5. The difference in flight path routing demonstrates the effects of wind optimization.

Figure 4:
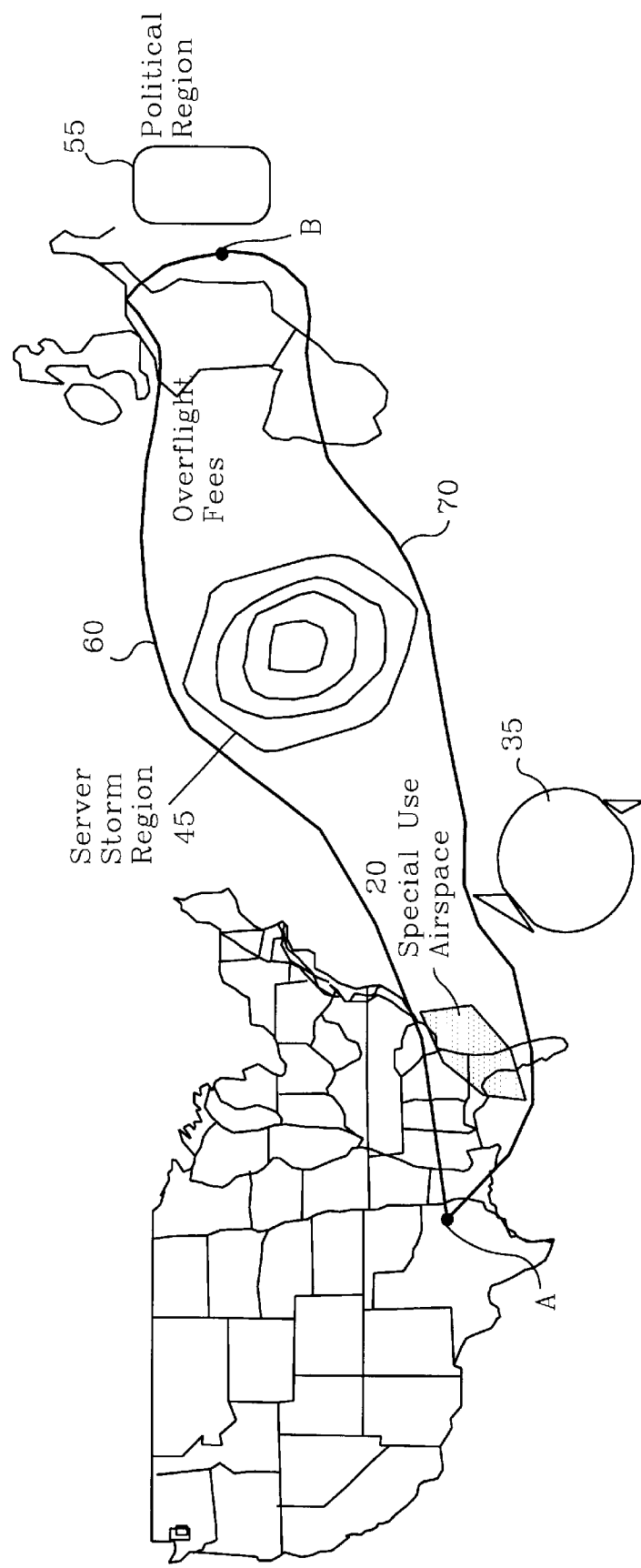
FIG. 4 is a map showing exemplary routes circumventing various restricted regions.

FIG. 4 illustrates the effects of a second optimization option, that is, region avoidance optimization. The figure depicts a generally eastbound flight across the Atlantic Ocean between location A, a Texas location and a location B, a European location. Between the origin and destination location are a number of regions that are advantageously avoided. Special Use airspace 20, severe weather regions 35 and 45 and political region 55 present obstacles to a typical flight. Region avoidance routing capabilities of the invention allows the user to select an optimized route that circumvents these regions. Route 60 and route 70 depict possible solutions as generated by this function. In practice, the user will provide further criteria to enable the invention to make a selection between these alternatives. Such further criteria may include wind contour lines or a required time of arrival. Various types of regions may be avoided using this function, including environmentally sensitive regions. In addition, the invention can accommodate changes in position, area, and degree of danger or cost associated with the avoidance region.

Route optimization considers multiple paths throughout the grid where each path is defined by the segments between nodes. Consistent with the mode of optimization, the algorithm selects the least cost route between the origin and the destination as connected by the segments.

In the example of FIG. 1, only three intermediary nodes and two stages were considered. In practice, there may be thousands of nodes and thousands of stages. The example treated the arrival cost at a particular node as though it were purely numerical. In the invention, the costs associated with each particular node must also be correlated with information about the direction of approach to that particular node. In other words, it may cost $5.00 to arrive at a node from the southwest, $5.50 if arriving at the same node from the west, and $6.00 if arriving from the northwest.

Figure 5:
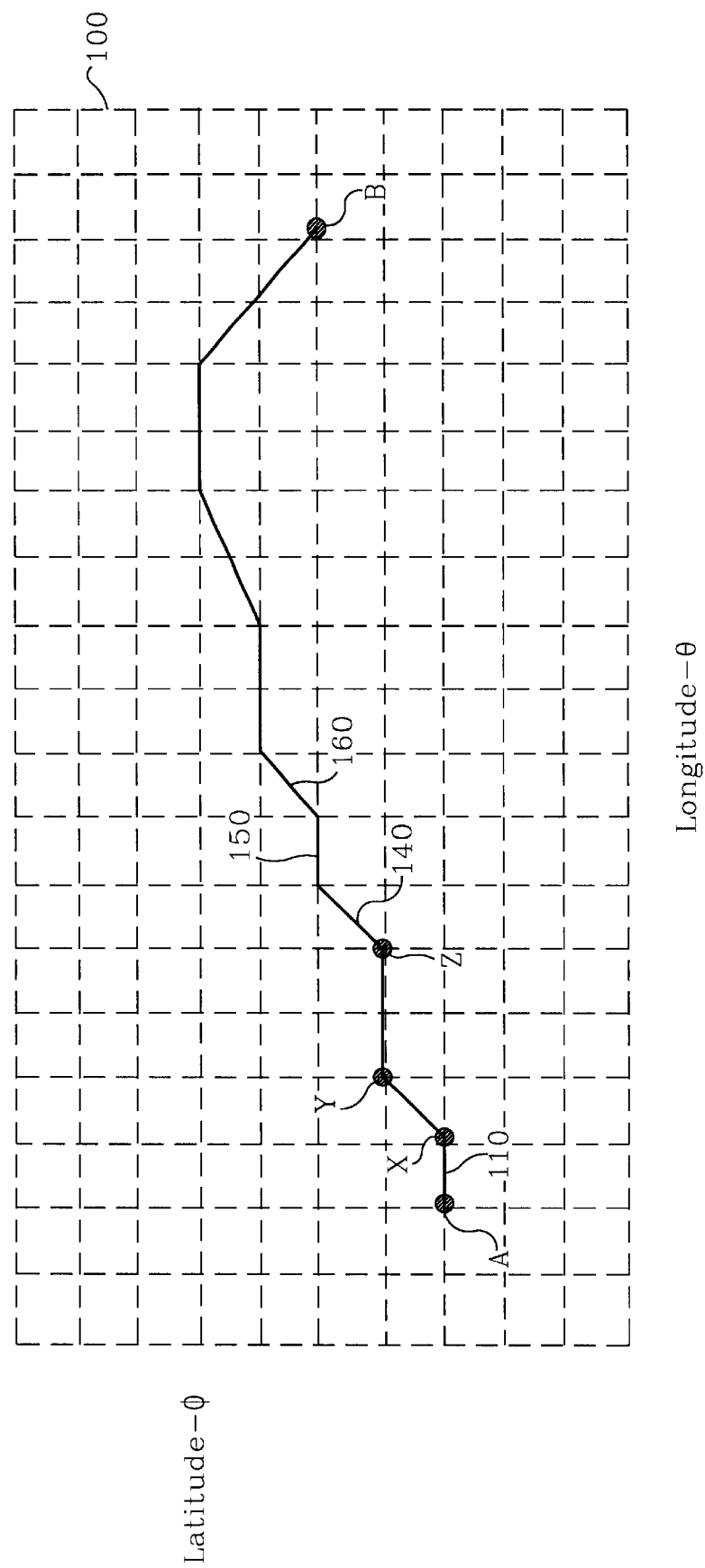
FIG. 5 is a grid illustrating path development between nodes A and B.

FIG. 5 provides an illustration showing the segmented route generated by this method for travel between location A and location B. Grid 100 provides a reference for the plurality of nodes of which node x, node y, and node z are marked. Segments connecting various nodes are marked 110, 120, 130, 140, 150, and 160.

Figure 6:
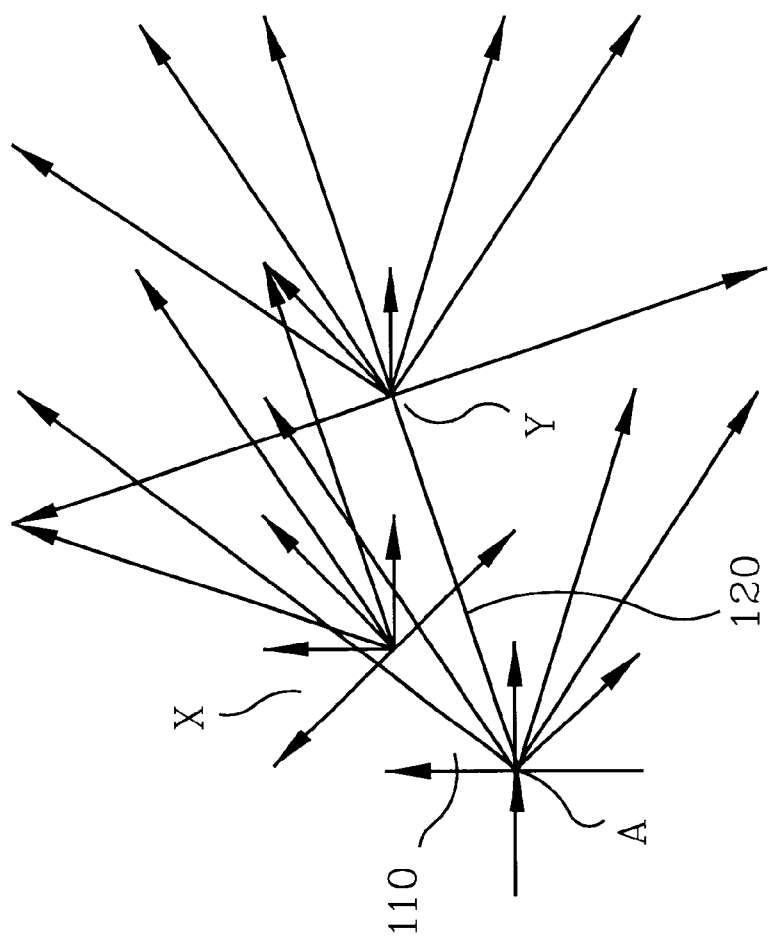
FIG. 6 is a grid illustrating possible departure segments from selected nodes.

In addition, the example treated node A as having three possible departure segments and nodes x, y, and z each having a single departure segment. In one embodiment of the invention, each node has nine possible departure segments for every approach segment. FIG. 6 illustrates one variety of possible departure segments, wherein node A is the origin location from which nine departure segments are possible. Node x and node y can be reached from node A in a single segment. As a function of the direction of approach at node x (denoted as segment 110), this embodiment of the invention provides nine possible departure segments from that node. Similarly, from node y, there are nine possible departure segments available from node k based on the approach segment to node k (denoted as segment 120).

Thus far, the example has only considered the lateral route. Air travel also includes a vertical path and this too can be optimized. Parameters associated with the optimization of the vertical path include wind speed, aircraft weight, and cost index. The cost index serves as a model of the aircraft performance. Based on these parameters (including wind speed, aircraft weight, and cost index) there is a corresponding optimum cruise altitude, speed and fuel flow rate. In one embodiment of the invention, the vertical path is optimized using a stored look-up table.

As previously noted, various external factors affect the optimization calculation. These factors include wind speed and direction, over-flight fees, special use or restricted airspace, and flight scheduling concerns. Optimization necessitates a balancing of these factors. For example, optimization based solely on wind data may provide a route that carries substantial over-flight fees, violates restricted airspace and may actually reach the destination too late. A different optimization may strike a satisfactory balance in that wind advantages are substantially maximized and disadvantages are substantially minimized, commensurate with substantially minimized over-flight fees and avoidance of restricted airspace (regions) in which the flight satisfies a required time of arrival.

In one embodiment of the invention, routes can be displayed over a world map as in FIG. 3. Overlays may include wind fields, restricted regions and regions associated with over-flight fees as in FIG. 4. Fuel requirements as well as en route times can be displayed and compared for various routes. Comparisons can be made with great circle and other routes. Corresponding with the parameters to be optimized, typical modes of operation for the invention include wind optimization, over-flight fee optimization, region avoidance, and meeting a desired time of arrival.

In operating one embodiment of the invention, the user specifies the origin and destination locations, the parameters (or parameters) to be optimized, and selects a viewing option. Users of the invention may include the aircraft pilot or other flight planning personnel. Viewing options might include selecting from among various depictions of the globe or a map and may include options for image rotation and zooming. The user also may be presented with various options for saving calculated routes. Other options allow for retrieval and display of previously saved routes. These functions allow the user to compare various routes. Other functions may allow the user to display multiple routes simultaneously or overlay such data as wind maps or restricted regions. In one embodiment, an assortment of features allows the user to compare routes based on forecasted, as well as actual, weather.

Section Two

The description of the lateral path optimizer is organized as follows:

A. Overview—including summarized process steps and various optimization schemes.

B. Dynamic Programming Method—derivation and algorithm overview; includes coordinate transformation and detailed process steps.

C. Application to flight path optimization.

D. Representative Pseudo Code for implementation.

E. Implementation of avoidance region and over-flight fees.

F. Implementation of Required Time of Arrival along with alternative methodologies.

G. Results obtained in various modes of optimization.

Part A—Overview

The invention utilizes a dynamic programming method for determining an optimal lateral route. The following description provides an overview and additional detail regarding the dynamic programming method. More detailed descriptions of dynamic programming appear in later sections of this application.

Figure 7:
FIG. 7 is a larger scale view of a portion of FIG. 2.

In one embodiment, given the location of the origin and destination, a state space search region (or "grid") is generated encompassing these locations. FIG. 2 shows a state space search region for a flight from Minneapolis to Paris. FIG. 7 depicts a smaller scale view of a portion of this state space region 100. FIG. 7 illustrates one embodiment of a node arrangement, wherein node x, node y and node z are marked atop a portion of map 5. In one embodiment, the grid encompasses the region to be searched for the optimal flight path and has dimensions $N_\theta$ by $N_\phi$. The size of the grid is a balance between the computation time and range of options for a suitably optimized route. In other words, if the grid is too small, then, in attempting to optimize, the invention will specify a route that follows along a boundary of the grid. This indicates that the boundary of the grid is serving as an artificial limitation on the optimization of the route. On the other hand, if the grid is too large, then computation time is longer. The grid extends a short distance beyond the origin A and destination B locations to allow for advantageous, but circuitous routes.

In one embodiment, the grid includes a large number of latitude and longitudinal lines and has a node at each intersection. The invention optimizes a route of interconnected nodes throughout the grid.

The method implemented by one embodiment of the invention is as follows:
1. Beginning with the origin location, an approach segment is assumed and nine departure segments are generated. This is the first stage. For each approach segment there are nine possible departure segments. The incremental cost for each transition is calculated. The nodes thus generated become active nodes. Active nodes are nodes eligible for further extension and consideration as part of the solution to the optimization process.
2. At each active node generated by the first stage, a set of nine departure segments are generated. This is the second stage. The incremental cost for each transition is again calculated. The total cost to the next node is calculated by adding the incremental cost to the accumulated cost. The recursive equation for the accumulated cost is given by:

$$C_{i+1}(\theta_{i+1}, \phi_{i+1}) = \min_{a_y, \pi, C_L, h, V_a} [C_i(\theta_i, \phi_i) + \Delta C(\Delta\theta, \Delta\phi)]$$

If the node was reached previously by a different path, then the path having the lowest accumulated cost, along with the direction of approach, is retained with that node in the grid.
3. The process continues in stages. For each active node, a set of nine possible departure segments are generated. The node which was extended then becomes inactive. An inactive node can become active again if reached by an extension and the new cost is lower than the previous cost to reach that node. This is implemented by providing an even stage active node list and an odd stage active node list. This technique allows one active node list to be retained while the other is being generated.
4. At each reached node, the cost is compared to the cost at the destination node. If the cost at the node is larger than the cost to the destination node, then the node is removed from the active node list. Initially, the destination node is assigned a sufficiently high cost. If the assigned cost to arrive at the destination node is too low, then no other path will be found to be lower. In this case, the optimized cost to arrive at the destination node will match the assigned cost to arrive at the destination node. To prevent such a result, optimization should be repeated using a higher cost to arrive at the destination node. The process continues until no active nodes remain.
5. The path is then generated by starting at the destination node and proceeding backwards from the destination location to the origin location using the stored direction of approach associated with each node in the path.

The invention may incorporate data from a variety of sources in determining the cost to arrive at any particular node. The invention may utilize global databases showing regions having over-flight fees and restricted airspaces. The invention may also utilize data showing wind and atmospheric information.

Figure 8:
FIG. 8 is a global view depicting wind fields over 50 knots at a particular altitude.
Figure 9:
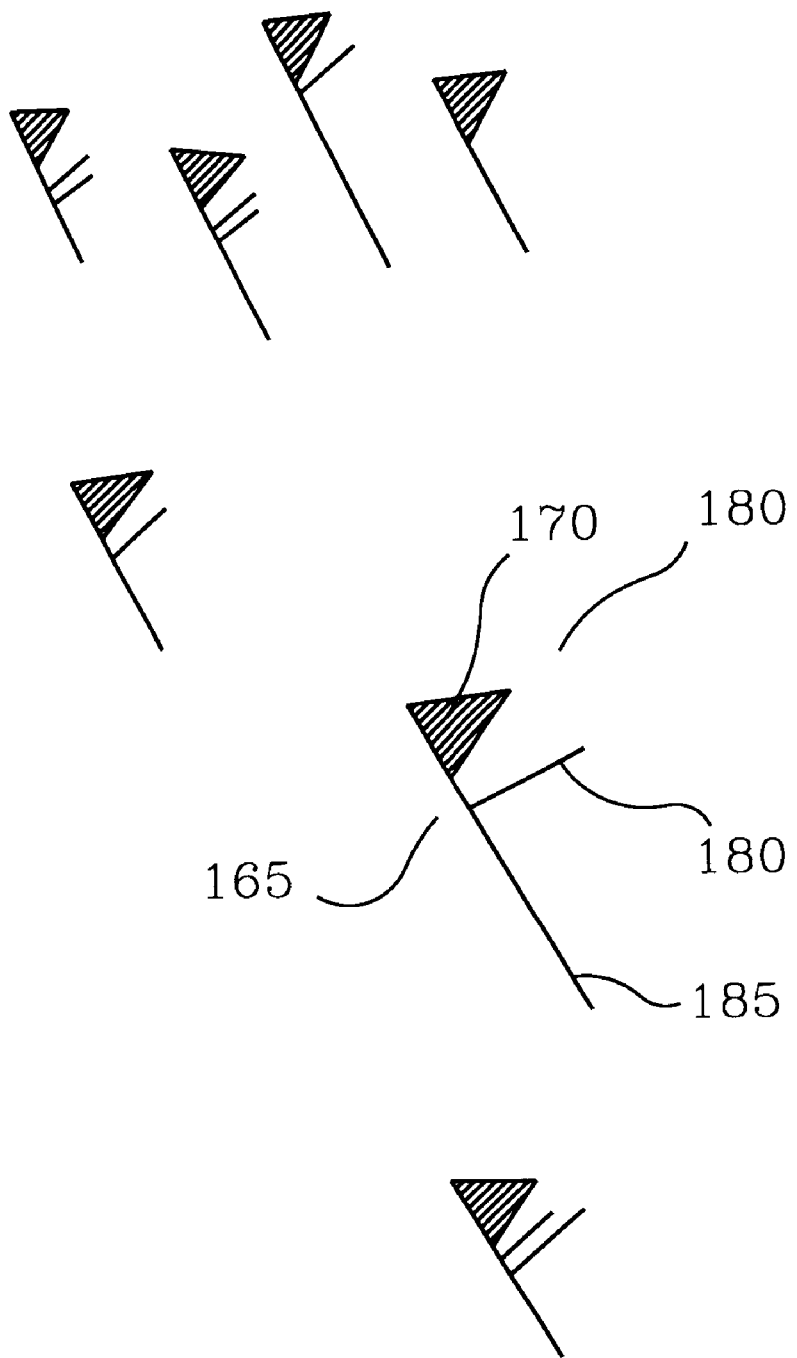
FIG. 9 is a larger scale view of a portion of FIG. 8.

As an example of such data, consider the wind data illustrated in FIG. 8. The figure depicts a global view of prevailing winds exceeding 50 knots at a selected altitude. Wind information is represented by wind barbs. FIG. 9 depicts a closer view of such a wind barb 165 in a particular geographic region. Each wind barb 165 denotes wind direction and magnitude. The magnitude is indicated by the tail 170 on the barb, wherein a triangle 175 indicates 50 knots and each line 180 indicates an additional 10 knots. Wind direction is denoted by the barb direction indicated as 185.

Figure 10:
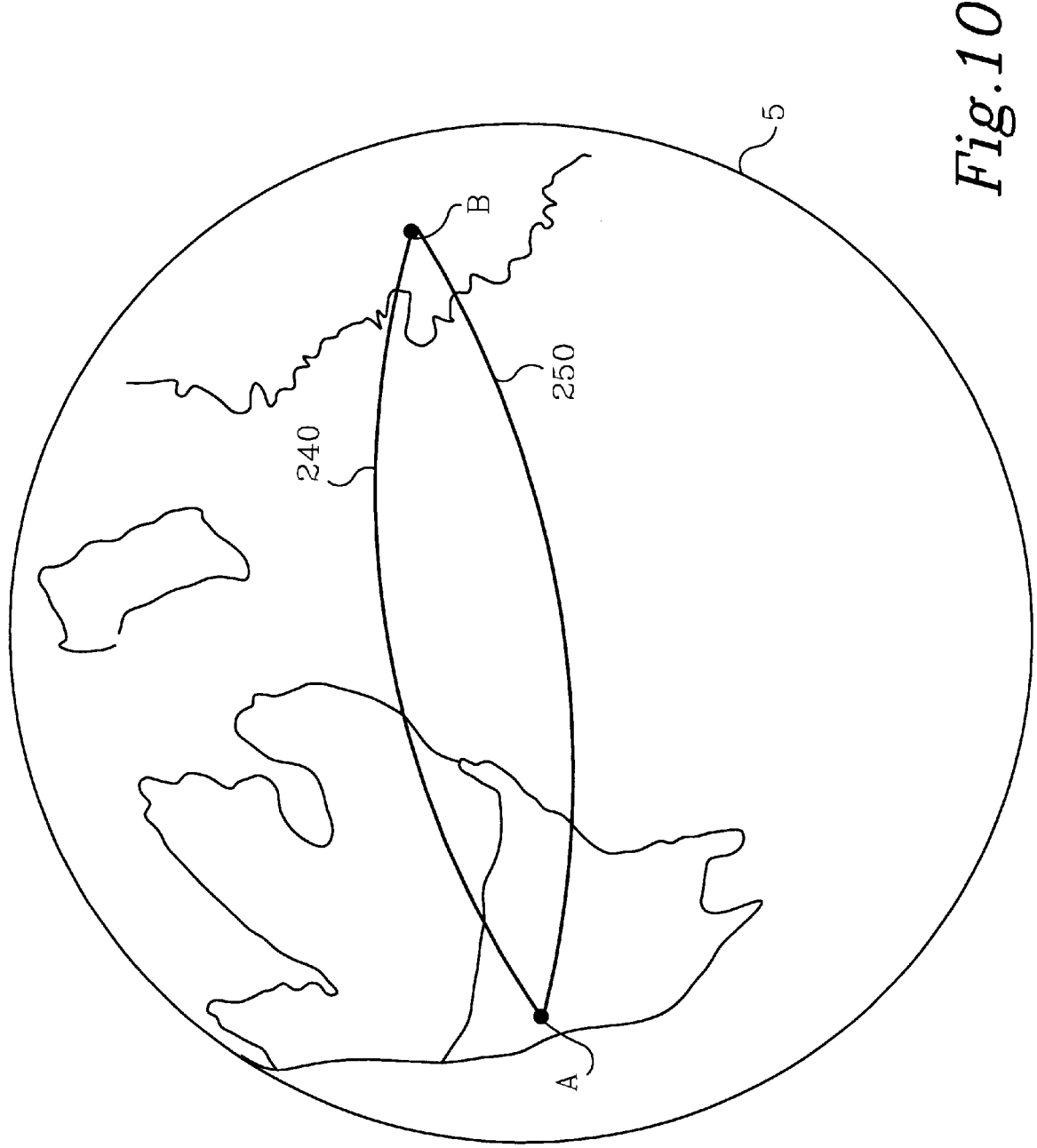
FIG. 10 is a global view illustrating a great circle route and a wind-optimized route between a node at an origin location and a node at a destination location.

Depending upon the desired optimization selected by the user, various routes may be generated. Optimization choices available to the user include the following:

Wind Optimal Routing: as previously noted, FIG. 3 illustrates the effects of wind optimization on routing. FIG. 10 provides map 5 illustrating another example of wind optimal routing. In FIG. 10, origin location A represents Los Angeles and destination location B represents London. Route 240 is the shortest distance corresponding to the great circle route. Route 250 is a wind-optimized route that requires less fuel and less en route time.

Figure 11:
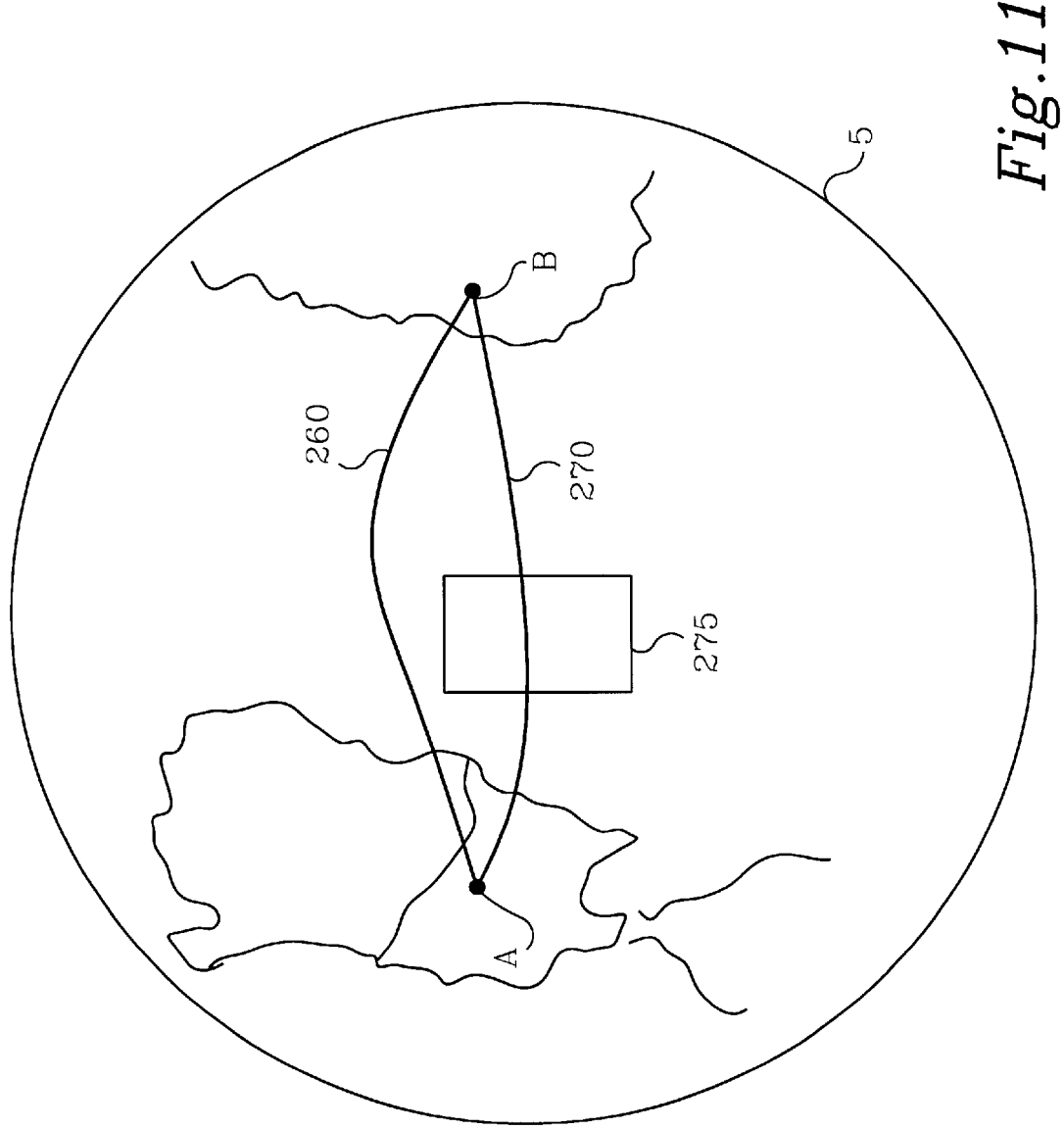
FIG. 11 is a global view illustrating exemplary routes between a node at an origin location and a node at a destination location, in light of an avoidance region.

Region Avoidance Routing: as previously noted, FIG. 4 illustrates the effects of region avoidance optimization. FIG. 11 provides another example of region avoidance routing. The illustration depicts a flight from location A in Minnesota to location B in Paris wherein a hazardous weather system lies along the path between the two cities. Flight route 260 circumvents the weather system with minimal fuel and flight route 270 passes through the weather system 275 with minimal fuel.

Over-Flight Fees: A third optimization can be performed to minimize over-flight fees. Certain political regions levy over-flight fees for transient aircraft. Over-flight fees may be an attempt to mitigate harm from noise and pollution. Routing of aircraft to avoid such fees can be cost effective. The subject matter calculates routes based, in part, on the over-flight fees. Routes minimizing over-flight fees can be compared with alternative routes offering such advantages as reduced transit time or reduced fuel consumption.

Figure 12:
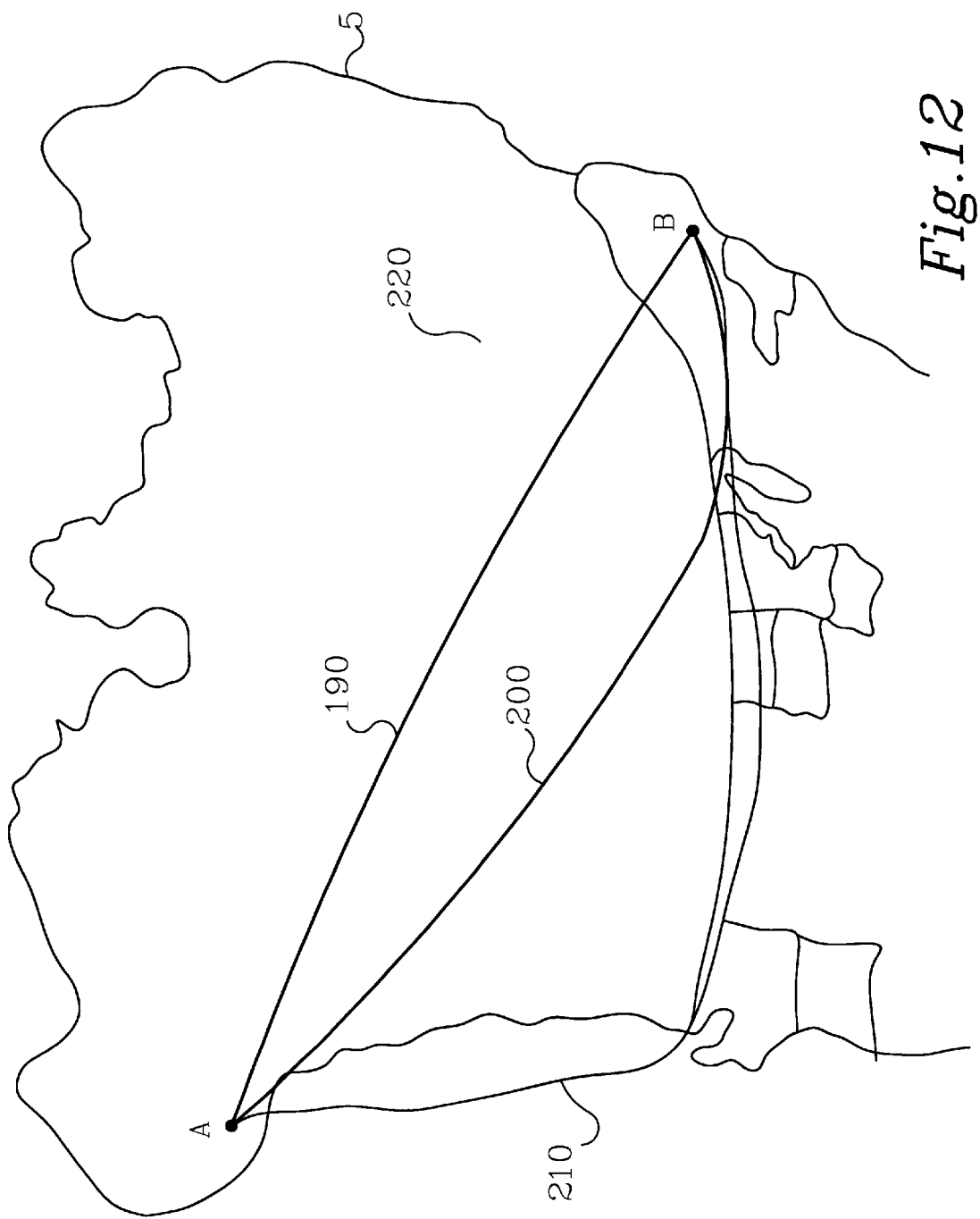
FIG. 12 is a view illustrating exemplary routes between a node at an origin location and a node at a destination location based on considerations of overfly costs and minimum fuel.

FIG. 12 illustrates an example of a route configured with regard to over-flight fees. A minimum fuel route from location A (Anchorage) to location B (New York) with over-flight fees over Canada 220 is shown. An over-flight fee is assumed to be charged for flight in Canadian airspace. Three routes are shown: (a) a minimum fuel, labeled 190; (b) minimum fuel with Canadian over-flight fees 210; and (c) minimum fuel with a specified time of arrival 200.

Required Time of Arrival: A fourth optimization function enables the user to specify a required arrival time. Accurate flight scheduling reduces operating costs and therefore, efficiency. The invention enables route optimization that capitalizes on the favorable effects of tailwinds while avoiding unfavorable headwinds, circumvents weather or other restricted airspace, and yet achieves the required time of arrival.

Figure 13:
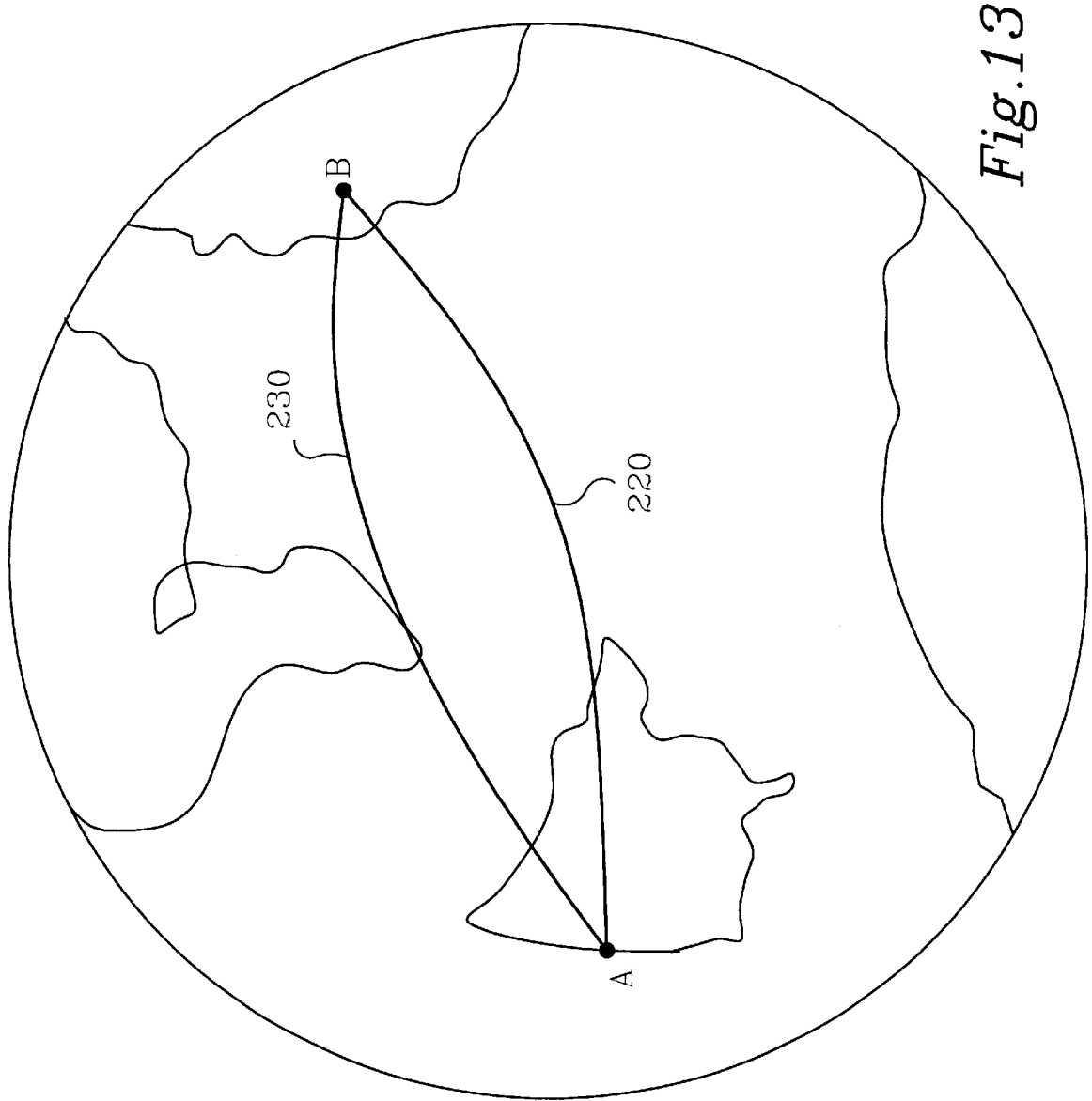
FIG. 13 is a global view illustrating a minimum fuel route and a minimum fuel to satisfy a required arrival time route between a node at an origin location and a node at a destination location.

FIG. 13 depicts the effect of arrival time on aircraft routing. Route 230 provides the lowest fuel requirement but at the cost of a delayed arrival. Route 220 satisfies the arrival time requirement at a minimum fuel consumption.

During the course of a flight, changed conditions may compel a change in routing. Such changed conditions may include un-forecasted weather, equipment failure, or even in-flight emergencies. Dynamic routing enables determination of a new route based on the present aircraft position and the desired destination. Such in-flight dynamic routing can be performed by ground-based operators or airborne personnel. As with the aforementioned modes of optimization, dynamic routing may include altering the lateral path, the vertical path, and speed profiles.

Part B—Dynamic Programming Method

Dynamic programming can be applied to optimization where the objective is to minimize $J_{N+1}[x(N+1)]$, where $$J_{N+1} = \min_{u(1)\text{-}u(N)} \sum_{j=1}^{N} L[x(j), u(j), j]$$

where the states $x(k)$ obey the following state transition equation:

$$x(k+1)=g[x(k),u(k),k]; \; k=1,N$$

and the states and the controls are subject to the following constraints:

$$C[x(k),u(k)] \leq 0$$

The underlying principle of dynamic programing provides that an optimal policy has the property that whatever the initial state and initial decision are, the remaining decision must constitute an optimal policy with regard to the state resulting from the first decision. This principal is applied in a recursive solution for the controls and is determined as follows. The optimum cost function becomes:

$$J_{k+1} = \min_{u(1)\text{-}u(k)} \sum_{j=1}^{k} L[x(j), u(j), j]$$

Expressed in recursive form, this becomes:

$$J_{k+1} = \min_{u(1)\text{-}u(K)} \left\{ L[x(k), u(k), k] + \sum_{j=1}^{k-1} L[x(j), u(j), j] \right\}$$

$$J_{k+1} = \min_{u(K)} \left\{ L[x(k), u(k), k] + \min_{u(1)\text{-}u(k-1)} \sum_{j=1}^{k-1} L[x(j), u(j), j] \right\}$$

or $$J_{k+1} = \min_{u(K)} \{L[x(k), u(k), k] + J_k\}$$

Substituting for the $x(k)$ $$J_{k+1} = \min_{u(K)} \{L[g(x(k-1)), u(k), k)] + J_k\}$$

Figure 14:
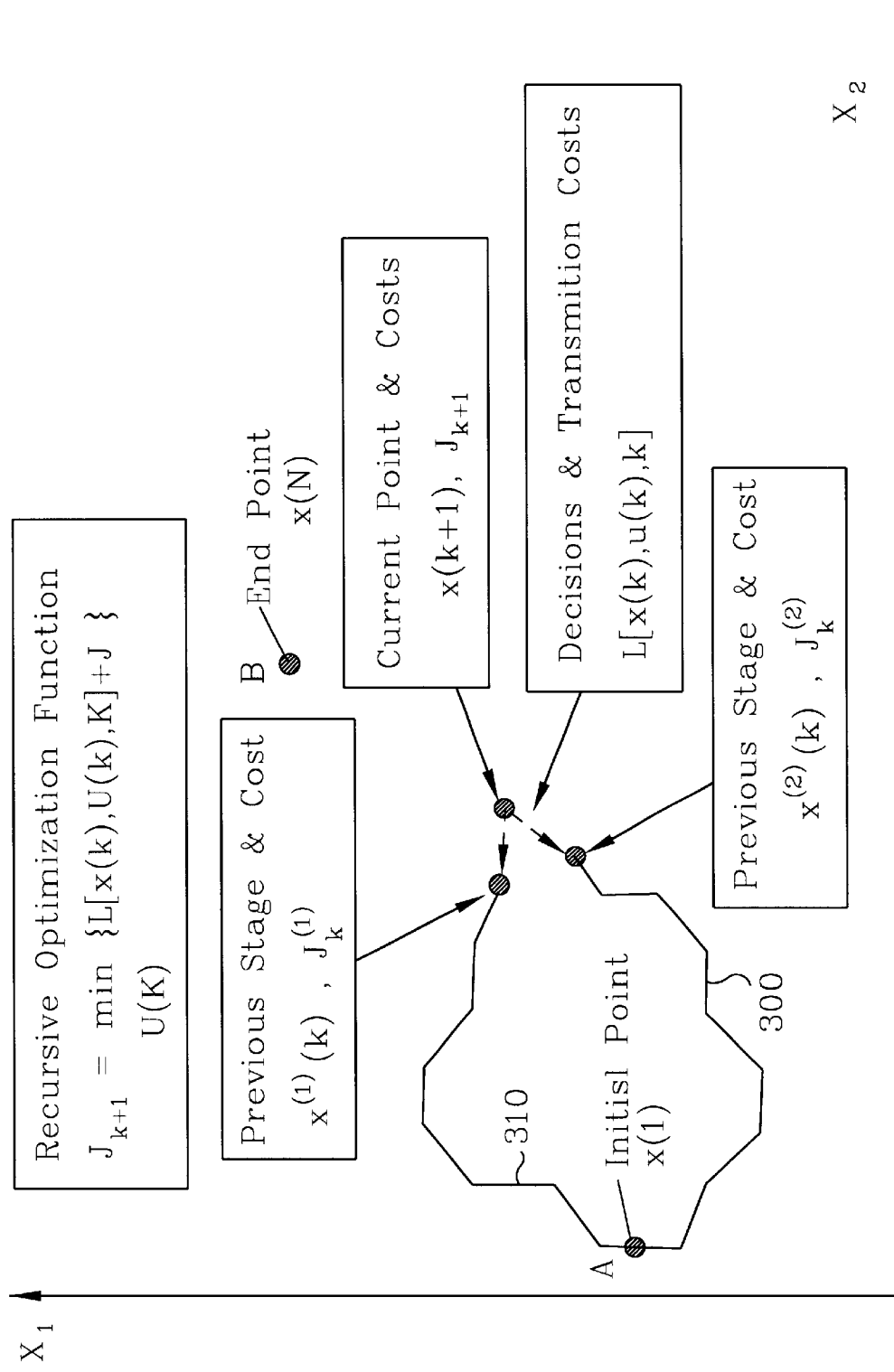
FIG. 14 is another view of a grid illustrating path development between nodes A and B.

This technique, when applied to route optimization, becomes a matter of beginning with a specified initial state and achieving the desired final state. In other words, begin with a set of possible initial conditions and end up at the final location, or expressed alternatively, start at the initial location and end at a set of possible final locations. FIG. 14 depicts the dynamic programming approach.

FIG. 14 represents routing expressed in coordinates $x_1$ and $x_2$ where the origin location A is denoted as $x(1)$ and the destination location B is denoted as $x(N)$. Path 300 and 310 are alternative routes approaching the destination location B. The recursive optimization function being implemented is $$J_{k+1} = \min_{u(K)} \{L[g(x(k-1)), u(k), k)] + J_k\}$$

As noted in FIG. 14, the previous stages are represented as $x^{(1)}(k)$ having cost $J^{(1)}_k$ and $x^{(2)}(k)$ having cost $J^{(2)}_k$. The decisions and transition costs can be represented as $\Delta C[x(k), u(k),k]$.

In one embodiment, to achieve a solution using dynamic programming, the following steps are performed:

1) Construct a state space grid having dimensions $x=(x_1,x_2)$.
2) Divide into stages wherein k denotes a particular stage number. A stage is defined as the step to the next set of nodes.
3) At each stage, the cost associated with the transition from the current state $x(k)$ to the set of possible states is calculated. Possible states descending from current state $x(k)$ include $x^{(1)}(k+1), x^{(2)}(k+1)$ . . . .
4) The optimal control $u(k)$, and the corresponding performance value $J_k$ is derived from the recursive optimization function. If the state has been reached before retain the lowest accumulated cost at the node and the corresponding approach segment.
5) The process ends when the desired destination state has been reached and the cost to other states is greater. Determine the total accumulated cost to the state from the recursive optimization function.
6) The optimal path corresponding to the initial state $x(1)$ is recovered by inserting the optimal control policy.

Dynamic programming is advantageous because it finds a global solution and accounts for state variable constraints.

Part C—Application to Flight Path Optimization

In route optimization, there are seven states, namely: velocity V, flight path angle $\gamma$, heading $\psi$, altitude h, longitude $\theta$, latitude $\phi$, and mass of fuel $m_f$. Quantization of each state to N levels would create a state space grid having dimensions characterized by $$N_{grid} = N_V \times N_\gamma \times N_\psi \times N_h \times N_\theta \times N_\phi \times N_{m_f}$$

Such a grid would include an extremely large number of nodes.

Practical approximations can reduce the dimensions of the grid and yet render a reasonable solution with a marginal effect on accuracy. A first assumption is that the aircraft flies only in cruise mode. Cruise mode is operation at a quasi-steady state (relatively constant speed and altitude). Also, it is assumed that the climb-to-cruise and the descent-from-cruise transitions are made instantaneously. These approximations allow discarding of the velocity, flight path angle and altitude states (V,$\gamma$, h). Furthermore, because the final state is a great distance from the initial state, the heading state $\psi$ may also be dropped. The mass of fuel state $m_f$ may further be omitted. The remaining states are then longitude and latitude ($\theta$, $\phi$) and the grid dimension becomes Ngrid=$N_\theta \times N_\phi$. Based on these assumptions, two equality constraints must be satisfied as follows:

$$T(h, V_a, \pi) = D(h, V_a, C_L)$$

$$L(h, V_a, C_L) = W$$

The integral cost function can be expressed in a recursive form as follows:

$$C = \int_0^{s_1} \left[\frac{(FFR + CI)}{V}\right] ds + \int_{s_1}^{s_2} \left[\frac{(FFR + CI)}{V}\right] ds$$

The transition cost ($\Delta C$) is given by $$\Delta C = \int_{s_1}^{s_2} \left[\frac{FFR + CI}{V}\right] ds$$

then, the recursive formula for the cost is $$C_{i+1}(\theta_{i+1}, \phi_{i+1}) = C_i(\theta_i, \phi_i) + \min_{u_i} \Delta C(\Delta\theta, \Delta\phi)$$

The lateral acceleration ay is selected to make the transition to the new latitude-longitude position. The remaining control variables (vertical flight control variables) are chosen to optimize the transition costs ($\Delta C$). Thus, the general method can be broken into a lateral path solver and a vertical path solver.

Route Solver Module

Figure 15:
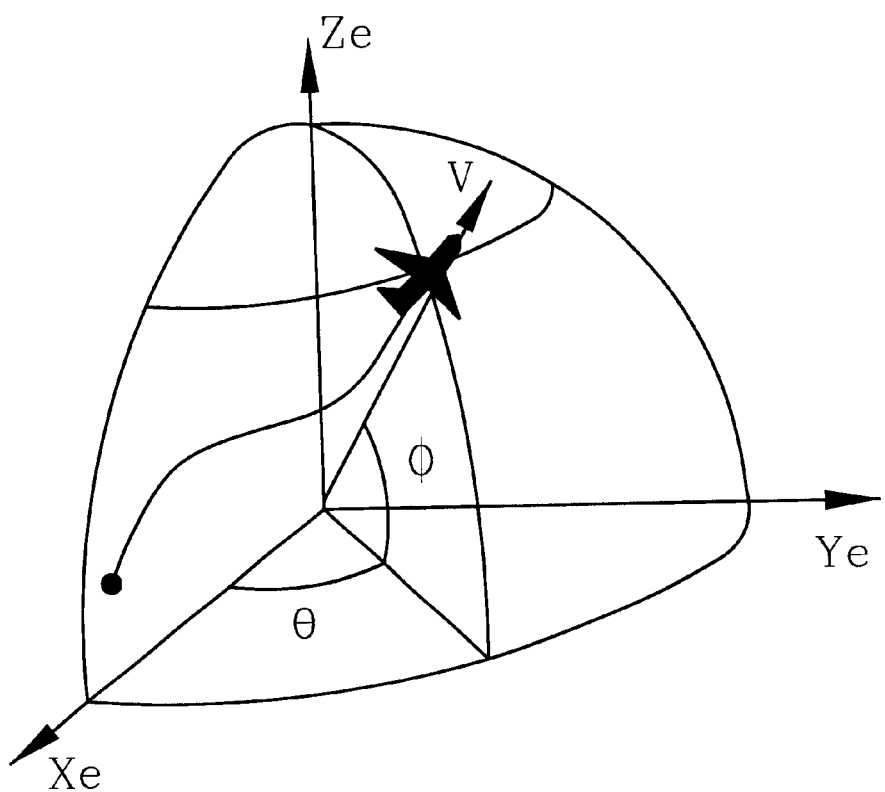
FIG. 15 is a coordinate system illustrating one geometry for route planning.

In one embodiment of the invention, the route solver performs the optimization calculations. As applied to flight path optimization, one embodiment of the route planning geometry is shown in FIG. 15. FIG. 15 depicts a three-axis coordinate system of $X_e$ by $Y_e$ by $Z_e$. Angle $\theta$ and angle $\phi$ denote the longitude and latitude, respectfully, and V denotes the velocity.

Other variables in the various equations are assigned the following definitions:

| | | | |
|---|---|---|---|
| $a_y$ | lateral acceleration | CI | fuel-time cost index |
| C | cost function | D | drag |
| FFR | fuel flow rate | Tx,Tz | thrust components |
| g | gravity constant | V | Velocity |
| h | altitude | $\theta$ | longitude |
| L | Lift | $\phi$ | latitude |
| M | Mach Number | $\psi$ | heading |
| m | mass | $\sigma$ | roll angle |
| $m_f$ | mass of fuel | $\gamma$ | flight path angle |
| R | radial height | $\mu$ | gravitational constant |
| $R_0$ | radius of the earth | $\omega_e$ | earth's rotation rate |
| S | arc length | $\rho$ | density |
| SOS | speed of sound | | |
| $T_e$ | temperature | | |

The objective of minimizing, or achieving, a desired parameter is expressed in the form of a cost function. The cost function may contain a number of terms, including fuel, time, weather risk, over-flight fees and restricted areas. Variables denoted as K are gain factors and CI denotes the fuel-time cost index. The cost index is a function of the aircraft and engine performance and operating environment.

$$C = \int_0^{s_f} \left\{\left[\frac{FFR + CI}{V}\right] + K_r R(\theta, \phi) + K_w W(\theta, \phi) + K_{sua} SUA(\theta, \phi) + K_p P(\theta, \phi) + K_e e(\theta, \phi)\right\} ds$$

Any term in the above equation can be eliminated by setting the gain factors $K_i$, or CI, to a value of zero. To simplify the description, only the fuel and time terms will be used. The other terms will be added subsequently.

Minimizing the cost function amounts to minimizing the weighted sum of fuel and time. Mathematically optimization can be stated as follows:

$$C = \int_0^{t_f} [FFR + CI] dt = \int_0^{s_f} \left[\frac{FFR + CI}{V}\right] ds$$

This calculation is subject to dynamic and static constraints as follows:

$$\dot{V} = \frac{(T_x - D)}{m} - g\sin\gamma + \omega_e^2 R\cos\phi(\sin\gamma\cos\phi - \cos\gamma\sin\phi\sin\psi)$$

$$\dot{\gamma} = \frac{(L - T_z)\cos\sigma}{mV} - \left(g - \frac{V^2}{R}\right)\frac{\cos\gamma}{V} + 2\omega_e\cos\psi\cos\phi + \frac{\omega_e^2 R\cos\phi}{V}(\cos\gamma\cos\phi + \sin\gamma\sin\psi\sin\phi)$$

$$\dot{\psi} = \frac{(L - T_z)\sin\sigma}{mV\cos\gamma} - \frac{V}{R}\cos\gamma\cos\psi\tan\phi + 2\omega_e(\tan\gamma\sin\psi\cos\phi - \sin\phi) + \frac{\omega_e^2 R\cos\psi\sin\phi\cos\phi}{V\cos\gamma}$$

$$\dot{h} = V\sin\gamma$$

$$\dot{\theta} = \frac{V\cos\gamma\cos\psi}{R\cos\phi}; R = R_0 + h$$

$$\dot{\phi} = \frac{V\cos\gamma\sin\psi}{R}$$

$$\dot{m}_f = FFR$$

where the initial and final condition are given by:

$$h(t_0) = h_0$$

$$\theta(t_0) = \theta_0; \theta(t_f) = \theta_f$$

$$\phi(t_0) = \phi_0; \phi(t_f) = \phi_f$$

The values of the constants are as follows:

$$g = \frac{\mu}{R^2}$$

$\mu = 1.4076554 \times 10^{16} \text{ft}^3/\text{sec}^2$ $R_0 = 2.092574 \times 10^7 \text{ft}$ $\omega_e = 7.2921112 \times 10^{-5} \text{rad/sec}$ Vehicle and atmospheric models are utilized to solve the aforementioned equations. These models can be expressed as follows:

Vehicle Models $$T = T(h, V, \pi, T_e) \quad \text{thrust}$$

$$D = D(h, V, \alpha, \delta_e) \quad \text{drag}$$

-continued $L = L(h, V, \pi, T_e)$     lift $FFR = FFR(h, V, \pi, T_e)$     fuel flow rate Atmospheric Models $T_e = T_e(\theta, \phi, h)$     temperature profiles $V_w = V_w(\theta, \phi, h)$     wind profiles $\rho = \rho(T_e)$     density $SOS = SOS(T_e)$     speed of sound The dynamic programming approach is explained next.

First the aforementioned equations are expressed as discrete state transition equations as follows:

$V = V + \dot{V}\Delta t$ $\gamma = \gamma + \dot{\gamma}\Delta t$ $\theta(k+1) = \theta(k) + \dot{\theta}(k)\Delta t$ $\phi(k+1) = \phi(k) + \dot{\phi}(k)\Delta t$ $\psi(k+1) = \psi(k) + \dot{\psi}(k)\Delta t$ $h(k+1) = h(k) + \dot{h}(k)\Delta t$ $m_f = m_f + FFR \Delta t$ Also $$\Delta t = \frac{\Delta S}{V}$$

$$\Delta m_f = \frac{FFR}{V}\Delta S = \frac{dm_f}{ds}\Delta s$$

$\Delta \psi$ is defined as $$\Delta \psi = \frac{a_y}{V}\Delta t$$

The parameter $\Delta\psi$ is limited by the maximum allowable acceleration of the aircraft.

Figure 16:
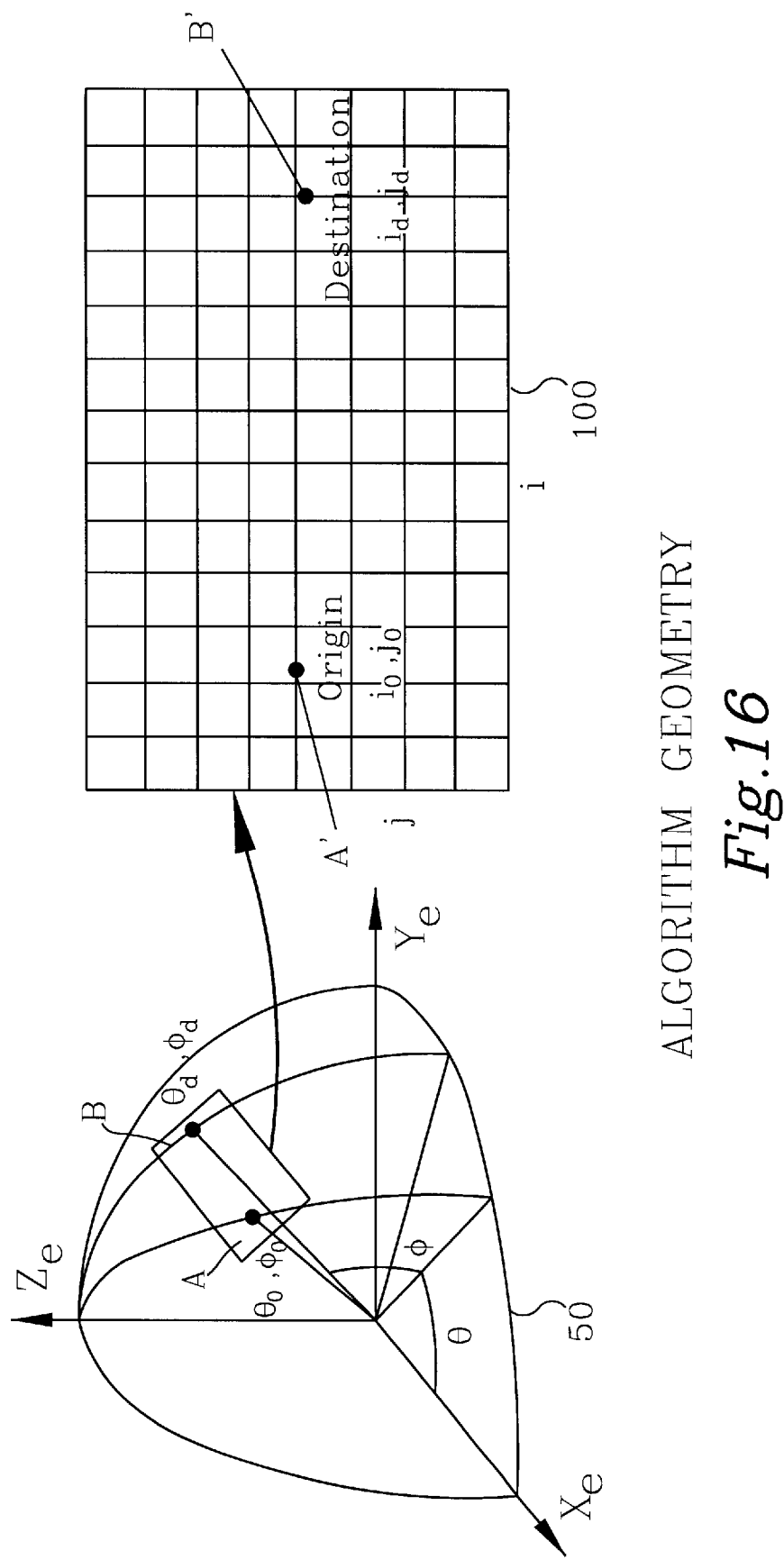
FIG. 16 is an illustration of geometry with a state space grid superimposed.

Route Solver—Algorithm Overview The geometry for the route solver algorithms is shown in FIG. 16. Much like the geometry of FIG. 15, a three-axis geometry 50 is again depicted. In FIG. 16, the origin location A has spherical coordinates longitude $\theta_o$ and latitude $\phi_o$ shown in geometry 50, and the destination location B has spherical coordinates longitude $\theta_d$ and latitude $\phi_d$ shown in geometry 50. In one embodiment of the invention, these standard earth centered spherical coordinates are then transformed to the rectangular geometry denoted in grid 100 of FIG. 16 wherein origin A' has coordinates $i_o$ and $j_o$ (cooresponding to origin A) and destination B' has coordinates $i_d$ and $j_d$ (corresponding to destination B). The rectangular geometry of grid 100 of FIG. 16 may be thought of as a spherical coordinate system with the equator positioned between the origin and destination. In the same manner, the weather profiles and avoidance region coordinates are also transformed to rectangular geometry. This transformation makes the grid more dimensionally uniform. After determining an optimal route, the route coordinates are then transformed back to the standard earth centered spherical coordinate frame. The coordinates are made discrete according to:

$$i = \frac{(\theta - \theta_0)}{\Delta \theta}\cos(\phi)$$

$$j = \frac{(\phi - \phi_0)}{\Delta \phi}$$

Route Solver Steps Detailed

The steps performed in the route solver algorithms are as follows:

1) In one embodiment, a pair of active node lists are generated. An even active node list and an odd active node list are generated so that the old active node list can be retained while the new active node list is being generated. The active node list contains the location of the node as shown in the Table 1. At the origin location (first active node), nine heading directions are generated. This is the first stage. The incremental cost for each transition is calculated.

Even Node List: i0=active_e(nt,1) j0=active_e(nt,2)

Odd Node List: i0=active_o(nt,1) j0=active_o(nt,2)

TABLE 1

| Active Nodes | | |
|---|---|---|
| Active Node nt | Grid Location i0 | Grid Location j0 |
| 1 | 4 | 5 |
| 2 | 1 | 2 |
| 3 | 6 | 7 |

After the first stage, for each active node, nine departure segments are generated. One embodiment of the invention utilizes a numbering scheme for the segments as shown in FIGS. 17A, 17B, 17C, 17D and 17E. FIG. 17A graphically illustrates twenty-four radial directions and their corresponding numerical labels. FIG. 17B illustrates the nine departure segments that are generated by the invention based on an entry direction corresponding to a segment marked 3. The segments depicted in FIG. 17B correspond to the radials in FIG. 17A and are marked 1, 5, 6, 11, 12, 19, 20, 4 and 2. The table of FIG. 17C indicates the approach segments as "i" and the nine departure segments as "j". For example, approach segment 3 corresponds to departure segments marked 1, 5, 6, 11, 12, 19, 20, 4 and 2.

FIG. 17D is a tabular representation of the segment corresponding to each numbered departure segment. For example, departure segment 1 corresponds to segment 1 as shown in FIG. 17A as well as segment 1 as shown in FIG. 17B. FIG. 17D provides that $\Delta x(i)$ is +1 and $\Delta y(i)$ is 0. The $\Delta x(i)$ and $\Delta y(i)$ steps for each of twenty-four exit directions are shown in FIG. 17D. As used herein, "step" refers to a change of position relative to the node under consideration and, in this embodiment, is described in rectilinear coordinates. As another example, segment 13 corresponds to a segment that lies between the node under consideration and the node located relative to +2 in the $\Delta x(i)$ direction and −3 in the $\Delta y(i)$ direction.

FIG. 17E is a tabular representation of reciprocal radials for each segment. For example, departure segment 1 corresponds to approach segment 3 and the reciprocal of segment 10 is segment 14.

After extending a node it becomes inactive.

2) The total cost to the next node is determined by adding the incremental cost to the accumulated cost. The recursive equation for the accumulated cost is given by:

$$C_{i+1}(\theta_{i+1}, \phi_{i+1}) = C_i(\theta_i, \phi_i) + \min_{u_i} \Delta C(\Delta\theta, \Delta\phi)$$

3) The cost at each node reached ($Cp_{ip,jp}$) is compared to two other costs. The two other costs to be compared with $Cp_{ij,jp}$ are, first, the cost previously stored at that node, and second, the cost stored at the destination node. If $Cp_{ip,jp}$ is less than both the cost previously stored at that node and the cost stored at the destination node, then the cost previously stored at that node is replaced with $Cp_{ip,jp}$ and the direction of approach to that node is also replaced with the direction of approach associated with $Cp_{ip,jp}$. If $Cp_{ip,jp}$ is more than either the cost previously stored at that node or the cost stored at the destination node, then the cost, and the direction of approach, previously stored at that node are retained and $Cp_{ip,jp}$, and the corresponding direction of approach to that node, is discarded.

$Cp_{ip,jp}$ entry$_{ip,jp}$=iomap$_{k\_exit}$

The approach segment is determined by the direction of the departure segment from the previous node using the mapping table as shown in FIG. 17C. If the cost at the node is larger than the cost to the destination node, then the node is removed from the active node list.

4) The process continues in stages. Inactive nodes can become active again if it is reached by an extension and the new cost is lower than the previous cost to reach that same node. The process continues until no active nodes remain.

5) The path is generated by starting at the destination node and proceeding backward to the origin location using the direction of approach for each node.

Part D—Representative Dynamic Programming Pseudo Code

The following is representative pseudo code for implementing the dynamic programming route solver in one embodiment.

| (1) | Indices, Parameters and Data Storage |
|---|---|
| i, j | Row and column index of a particular node |
| maxi, maxj | Number of rows and columns of node |
| is, js | Row and column index of starting location |
| ie, je | Row and column index of ending location |
| maxa | Maximum allowed number of active nodes |
| na | Number of active nodes |
| nexits | Number of allowed node exit directions (1 thru 8) |
| icost (maxi, maxj) | "Individual node cost" array |
| cp (maxi, maxj) | "Accumulated-cost-to-node" array |
| entry (maxi, maxj) | "Entry direction" array |
| aexit (8, 8) | "Allowed exit directions", for 8 entry possibilities; compass convention is: |
| active (maxa, 2) | Table of active nodes, contains active i and j indices |
| idelta (8) | Distance to a neighbor node in "i" direction (−1, 0, or +1) |
| jdelta (8) | Distance to a neighbor node in "j" direction (−1, 0, or +1) |
| active_flg (maxi, maxj) | Active/not active flag for each node |
| iomap (8) | Exit node-to-entry remapping (180° rotation) |

(2) Initialization
- Set all $cp_{i,j} = \infty$      Reset $cp_{ie,je} = \infty$
- Set all entry$_{i,j}$=0;      Reset entry$_{ie,je}$=1
- Set all active_flg$_{i,j}$ = 0;      Reset active_flg$_{i,j}$=1
- Set active$_{1,1}$ = ie;      Set active$_{1,1}$ =je ; Set na=1
- Set aexit$_{m,n}$

| m | n1 | n2 | n3 | n4 | n5 | n6 | n7 | n8 | n9 |
|---|---|---|---|---|---|---|---|---|---|
| 1 | 3 | 7 | 8 | 15 | 16 | 23 | 24 | 4 | |
| 2 | 4 | 8 | 5 | 9 | 10 | 17 | 18 | 3 | |
| 3 | 1 | 5 | 6 | 11 | 12 | 19 | 20 | 4 | |
| 4 | 2 | 6 | 7 | 13 | 14 | 21 | 22 | 1 | |
| 5 | 7 | 2 | 3 | 14 | 15 | 22 | 23 | 6 | |
| 6 | 8 | 3 | 4 | 9 | 16 | 24 | 17 | 7 | |
| 7 | 5 | 4 | 1 | 10 | 11 | 18 | 19 | 8 | |
| 8 | 6 | 1 | 2 | 12 | 13 | 20 | 21 | 5 | |
| 9 | 13 | 6 | 12 | 20 | 21 | 2 | 22 | 11 | |
| 10 | 14 | 22 | 2 | 21 | 7 | 15 | 23 | 12 | |
| 11 | 15 | 7 | 14 | 22 | 23 | 3 | 24 | 9 | |
| 12 | 16 | 21 | 3 | 23 | 8 | 9 | 17 | 10 | |
| 13 | 9 | 24 | 16 | 8 | 17 | 4 | 18 | 11 | |
| 14 | 10 | 17 | 4 | 18 | 5 | 11 | 19 | 12 | |
| 15 | 11 | 18 | 10 | 5 | 19 | 1 | 20 | 9 | |
| 16 | 12 | 19 | 1 | 20 | 6 | 13 | 21 | 10 | |
| 17 | 21 | 12 | 6 | 12 | 2 | 22 | 14 | 19 | |
| 18 | 22 | 13 | 21 | 2 | 14 | 7 | 15 | 20 | |
| 19 | 23 | 14 | 7 | 15 | 3 | 24 | 16 | 17 | |
| 20 | 24 | 15 | 23 | 3 | 16 | 8 | 9 | 18 | |
| 21 | 17 | 16 | 8 | 9 | 4 | 18 | 10 | 19 | |
| 22 | 18 | 9 | 17 | 4 | 10 | 5 | 11 | 20 | |
| 23 | 19 | 10 | 5 | 11 | 1 | 20 | 12 | 17 | |
| 24 | 20 | 11 | 19 | 1 | 13 | 12 | 6 | 18 | |

- Set idelta$_n$, for n=1 . . . . .24= +1, 0, −1, +1, +1, −1, −1, −2, +2, +3, +3, +2, −2, −3, −3, −1, +1, +3, +3, +1, −1, −3, −3
- Set jdelta$_n$, for n=1 . . . . .24= 3, 4, 1, 2, 7, 8, 5, 6, 13, 14, 15, 16, 9, 10, 11, 12, 21, 22, 23, 24, 17, 18, 19, 20
- Set nexits (3) Compute Minimum Cost from End Location to Start Location
- LOOP: until number of active nodes, na, = 0
  - nc = 0, will contain number of active nodes added in -continued

- inner loop
- LOOP: for each active node, n. n from 1 to na
  - Get the indices, i, j of the active node from $active_{b,1} active_{n,2}$
  - Set $active\_flg_{i,j} = 0$
  - Get direction of last entry, k_ent from $entry_{i,j}$
  - LOOP for each allowed exit direction, k. Note: k from 1 to nexits, except very first time k from 1 to 8
  - Get candidate direction of exit, k_exit, from $aexit_{k\_ent,k}$
  - Compute indices, ip, jp of neighbor node in exit direction:
    $ip = i+ idelta_{k\_exit}$ ; $jp = j+ jdelta_{k\_exit}$
  - Compute cost from neighbor node to end location:
    choose one
    - $cost = cp_{i,j} + icost_{ip,jp}$ or
    - ∀ $cost = cp_{i,j} + (icost_{ip,jp} + icost_{i,j}) \cdot .5$
    If $cost < cp_{i,j}$ and $cost < cp_{is,js}$ save cost, and entry directions
    - $cp_{ip,jp} = cost$
    - $entry_{ip,jp} = iomap_{k\_exit}$
    If $active\_flg_{ip,jp}=0$, add to list of active nodes
    Increment number of active nodes, nc = nc + 1
    $active_{nc,1}=ip$; $active_{c,2}=jp$
    $active\_flg_{ip,jp}=1$
  - End of k Loop
- End of n Loop
- na = nc
- End of na Loop (4) Route Generation Indices, $ipath_n, jpath_n$, from Start Location to End Location
- $ipath_1=is$; $jpath_1=js$; $n=1$
- LOOP: until the end location, $ipath_n=ie$ and $jpath_n=je$, is reached
  - ip=ipathn ;jp=jpathn
  - $ipath_{n+1} = ip+idelta_{entry\ ip,jp}$
  - jpathn+1 = jp+jdelta$_{entryip,jp}$
  - Increment counter, n = n + 1
- End of Loop Part E—Avoidance Regions and Over-flight Fees Avoidance Regions:

Various methods can be employed to avoid regions. In one embodiment, in addition to the fuel and time cost, a penalty cost is associated with nodes within the avoidance region. The cost function, with the avoidance region cost included, is:

$$\Delta C = \left[\frac{FFR + CI}{V}\right]\Delta S + K_r R(\theta \cdot \phi)$$

If the region is to be avoided at all costs, then a very large number is assigned to $R(\theta,\phi)$ within the region. If the penalty in the region is varying, then varying values can be assigned to the function $R(\theta,\phi)$ within the region. The factor $K_r$ is adjusted to change the proximity of the path to the higher penalty areas of the region.

In another embodiment, the nodes within a region to be avoided can be eliminated from the grid. By eliminating nodes in avoidance regions, the number of calculations required for optimization is reduced. Regions treated as avoidance regions include regions of severe weather, special use airspace, politically sensitive regions, and environmentally sensitive regions. The cost function including the different region types is:

$$\Delta C = \left[\frac{FFR + CI}{V}\right]\Delta S + K_r R(\theta, \phi) + K_w W(\theta, \phi) + K_{sua} SUA(\theta, \phi) + K_p P(\theta, \phi) + K_e e(\theta, \phi)$$

Over-Flight Fees:

The cost of over flight fee are included in the cost function expressed in the following form:

$$\Delta C = \left[\frac{FFR + CI}{V}\right]\Delta S + K_o O_f \Delta S$$

where $O_f$ is the over flight charge per distance traveled.

The factor $K_f$ can be raised or lowered. A high gain will generate routes which may reduce, or even avoid, the over-flight fees.

Part F—Required Time of Arrival (RTA)

A required time is reached by adjusting the Cost Index (CI). In one embodiment, the route may be determined by iteration. First, an initial time cost index (CI) is selected. The selection of an initial CI can be made by the user or the computer may supply a value. Next, an optimized path is determined from which the time of arrival at the destination location is determined. The difference between the determined time of arrival at the destination location and the desired time is determined.

$$\Delta T = t_{desired} - t_{final}$$

Next, the cost index is adjusted. Here, the cost index carries a heavy weight on time.

$$CI_{i+1} = CI_i + K_t \Delta T$$

Increasing the cost index causes an earlier time of arrival and decreasing the cost index causes a later time of arrival. The weight and time at each node is determined from the following equations:

$$W(\theta_{i+1}, \phi_{i+1}) = W(\theta_{i+1}) + \Delta m_f$$

$$t(\theta_{i+1}, \phi_{i+1}) = t(\theta_{i+1}, \phi_{i+1}) + \Delta S/V$$

The cost index can only be reduced to a value corresponding to the maximum endurance cruise condition for that particular aircraft. At the maximum endurance, the fuel flow rate is at a minimum and the optimum cruise airspeed is then a function only of aircraft weight. To achieve time of arrivals later than that achieved with the minimum cost index, additional processes are used. Exemplary processes are as follows:

1) If the required time of arrival is earlier than that which can be achieved by setting CI at a minimum value, then CI is set to minimum cost index $CI_{min}$. The cruise airspeed, altitude and fuel flow rates may be computed from the tables using the current aircraft weight and the minimum cost index $CI_{min}$.

$$FFR = FFR(W, CI_{min})$$

$$h_{cru} = h_{cru}(W, CI_{min})$$

$$V_{cru} = V_{cru}(W, CI_{min})$$

2) The route is computed using one of the following methods:

A) Cost Function Method

1) The cost function in the lateral route solver is changed from minimum fuel and time to minimizing distance and time. The cost function increment is:

$$\Delta C = \Delta S + C_s \Delta t$$

2) An initial value of $C_s$ is chosen (by the user or the computer may supply a value) and an optimized route as well as time of arrival is determined. The time of arrival error (difference between the calculated time of arrival and the required time of arrival) is determined, and the factor $C_s$ is adjusted according to the time of arrival error:

$$C_s = K_S(T_{req} - T)$$

3) The iteration process is continued until the required time of arrival is achieved.

B) Path Stretching Method

Figure 18:
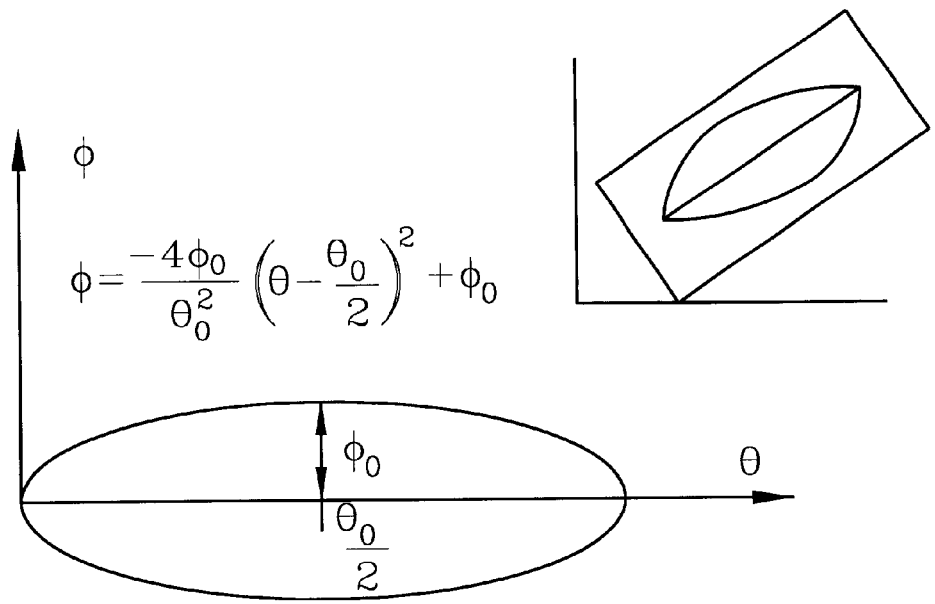
FIG. 18 is an illustration of lengthened paths around a great circle.

1) A set of paths around the great circle, shown in FIG. 18, is defined by:

$$\phi = \frac{-4\phi_0}{\theta_0^2}\left(\theta - \frac{\theta_0}{2}\right)^2 + \phi_0$$

where increasing values of $\phi_0$ increase the length of the path.

2) An initial value of $\phi_0$ is chosen, and the path is computed using the airspeed, fuel flow rate, altitude and ground speed, and the time of arrival is determined. If the required time of arrival is not achieved, then the of $\phi_0$ is adjusted with the time of arrival error:

$$\phi_0 = K_t(T_{req} - T)$$

Part G—Route Computation Results

The invention can provide advantageous routing as demonstrated by the following comparisons. It is noted, however, that these results are generated using assumed wind and atmospheric data as well as over-flight fees and avoidance regions representative of those existing at a particular time. As such, there exists no guarantee that future results will be similar. The following data shows results for these four cases:

1) Wind Optimal Routes
2) RTA Routes
3) Region Avoidance Routes
4) Over-flight Fee Routes 1. Wind Optimal Routes: A wind optimal route for a commercial aircraft flying from location A (Los Angeles) to location B (London) is shown in FIG. 10. The wind data is overlaid atop the image and is similar to the wind field illustrated in FIG. 8. Great circle route 240 is also shown for comparison. The wind optimal route deviates to the south to take advantage of favorable tailwinds. A comparison of the fuel and time is given in Table 2.

TABLE 2

Wind Optimal Route Comparison of Fuel Used and Time Los Angeles to London

| Route type | Distance (nm) | Fuel Used (lbs.) | Time (min) |
|---|---|---|---|
| Great Circle | 4739 | 225,640 | 606 |
| Min Fuel - Wind Optimal CI = 0 | 5019 | 219,495 | 586 |

The data shows a wind optimal route exhibits a savings of 6,145 pounds of fuel and 20 minutes of flight time.

2. RTA Routes: Wind optimal routes having a required time of arrival time (early and late) for a route between location A (Los Angeles) and location B (London) is shown in FIG. 13. The wind data is overlaid atop the image and is similar to the wind field illustrated in FIG. 8. The distance, fuel, and time is given in Table 3. The fuel and time for the RTA can be compared to the fuel and time for the no RTA case by referring to Table 2.

The required times of arrival are met but with an increased cost of fuel. The required times are achieved by changes in both the lateral and the vertical profile. The average speed on the early time of arrival is increased over the minimum fuel route. The average ground speed on the late time of arrival is less that the minimum fuel route and there is a significant change in the lateral path.

TABLE 3

Comparison of Fuel Used and Time For RTA Routes Los Angeles to London

| Type | Distance (nm) | Fuel Used (lbs.) | Time (min) |
|---|---|---|---|
| Early RTA RTA = 526 Min | 5003 | 253,917 | 529 |
| Late RTA RTA = 676 min | 4746 | 239,151 | 671 |

3. Region Avoidance: The minimum fuel route for a flight from location A (Minneapolis) to location B (Paris) with an avoidance region 275 shown in FIG. 11. The cost associated with nodes in the avoidance region is set to a high value so that the region will be entirely avoided. Three routes are shown: (1) a minimum fuel route with no avoidance region—route 270; (2) a minimum fuel route with the avoidance region, route 260; and (3) a minimum fuel, required time of arrival route with the avoidance region, (similar to route 260). The distance, fuel and time are compared in Table 4.

TABLE 4

Comparison of Fuel Used and Time With Avoidance Region Minneapolis To Paris

| Route type | Distance (nm) | Fuel Used Lb. | Time Min |
|---|---|---|---|
| (1) Minimum fuel with no avoidance region (CI = O) | 3760 | 170,147 | 436 |
| (2) Minimum fuel with the avoidance region | 3676 | 175,036 | 451 |

TABLE 4-continued

Comparison of Fuel Used and Time With Avoidance Region
Minneapolis To Paris

| Route type | Distance (nm) | Fuel Used Lb. | Time Min |
|---|---|---|---|
| (3) Minimum fuel with the avoidance region and a required time of arrival (RTA = 426 minutes) | 3673 | 176,098 | 426 |

4. Over-Flight Fees: A minimum fuel route for a flight from location A (Anchorage) to location B (New York) with over-flight fees in Canada is shown in FIG. 12. An over-flight fee is assumed to be charged for Canadian airspace. Three route are shown: (a) a minimum fuel, route 190; (b) minimum fuel with over-flight fees, route 210; and (c) minimum fuel with a specified time of arrival, route 200. The minimum fuel route 190 is the great circle route. The minimum fuel route with the over-flight fees 210 entirely avoids Canada. The middle route 200 is minimum fuel with over-flight fees and meeting a required arrival time. The distance, fuel and time is given in Table 5.

The minimum fuel with fees (flight around Canada) route, of course, takes more fuel and time than the minimum fuel route but has the lowest total cost—even when over-flight fees are included. The minimum fuel with fees and RTA route takes less fuel and time than the "around Canada" route but has a higher cost including the fees.

TABLE 5

Comparison of Fuel Used and Time with Over-Flight Fees
Anchorage to New York

| Type | Distance (nm) | Fuel Used Lb. | Time Min |
|---|---|---|---|
| (a) Minimum fuel | 2928 | 146,823 | 371 |
| (b) Minimum fuel with over-flight fees | 3278 | 163,005 | 416 |
| (c) Minimum fuel with over-flight fees and required time of arrival (RTA = 371 minutes) | 2970 | 148,593 | 370 |

Vertical Path Solver

Figure 19:
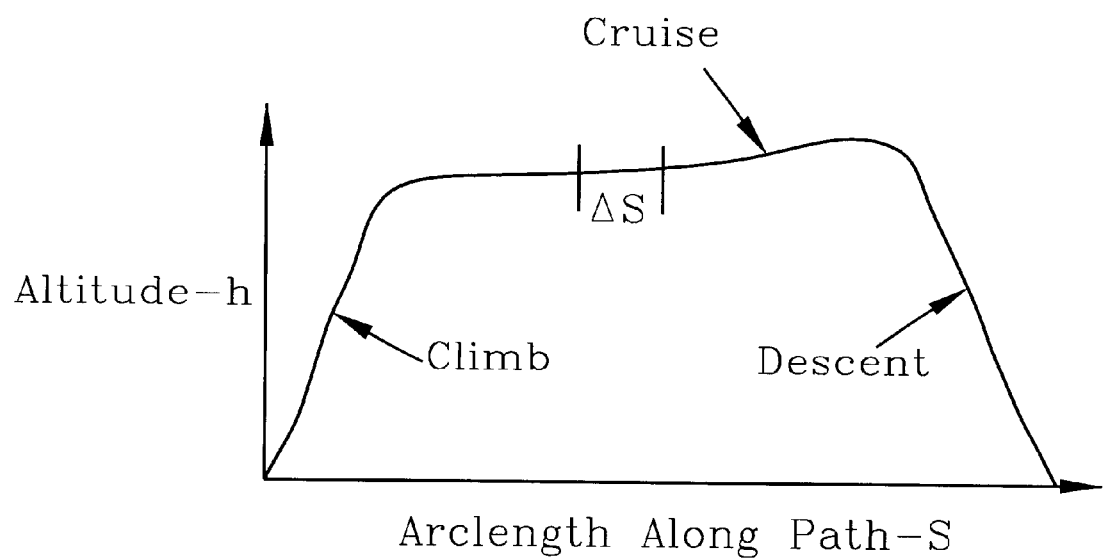
FIG. 19 is a depiction of the vertical flight path regimes.

At each step in the lateral path the transition cost $\Delta C$ is optimized. Optimizing of the transition costs $\Delta C$ implies optimization of the vertical path. In one embodiment, optimization of the vertical path is performed independent of the optimization of the lateral path. The vertical path is divided into three regimes: 1) climb to subsonic cruise; 2) subsonic cruise; and 3) descent. These regimes are depicted in FIG. 19.

The following is a description of the assumptions and approximations used for determining the transition cost within, and between, each of these three regimes.

1. Climb to Subsonic Cruise:

The cost increment for the climb to cruise is given by this integral:

$$\Delta C = \int_{S_1}^{S_2} \left[ \frac{FFR + CI}{V} \right] ds$$

Some approximation are made in calculating this integral. For example, it is assumed that the climb to subsonic cruise is made instantaneously. An increment of fuel and time is added. This increment is calculated and stored as a function of take-off weight.

$$\Delta C_{climb} = \Delta m_{fclimb}(W_{T.O.}) + CI \, \Delta T_{climb}$$

2. Subsonic Cruise to Subsonic Cruise:

The cost increment for the cruise to cruise transition is given by this integral:

$$\Delta C = \int_{S_1}^{S_2} \left[ \frac{FFR + CI}{V} \right] ds$$

It is assumed that the variables FFR, CI, and V do not change between $S_1$ to $S_2$, thus the integral can be expressed as:

$$\Delta C = \left[ \frac{FFR + CI}{V} \right] \Delta S$$

where the arc length increment is given by:

$$\Delta\theta = \theta(i+1) - \theta(i)$$

$$\Delta\phi = \phi(i+1) - \phi(i)$$

$$\Delta S = \sqrt{(R_0 \Delta\theta \cos\phi)^2 + (R_0 \Delta\phi)^2}$$

The control variables are chosen to minimize this function and to satisfy the cruise equilibrium conditions of thrust equals drag and lift equals weight, i.e., $$\min_{h, V_a, \pi, C_L} \left[ \frac{FFR(h, V_a, \pi) + CI}{V_a + V_w} \right]$$

subject to $T(h, V_a, \pi) - D(h, V_a, C_L) = 0$ $L(h, V_a, C_L) - W = 0$ $V = V_a + V_w$ The aircraft performance model describing thrust, drag, and fuel flow rates are required for this computation. This optimization operation can be advantageously computed off-line. The fuel flow rate, cruise altitude and speed can be stored as a function of the parameters weight (W), cost index (CI) and wind speed ($V_w$). The tables that are stored are:

$FFR = FFR(V_w, W, CI)$ $h_{cru} = h_{cru}(V_w, W, CI)$ $V_{cru} = V_{cru}(V_w, W, CI)$ In one embodiment, the aircraft weight, cost index and wind speed at the current aircraft location are used to determine the corresponding cruise altitude, speed, and fuel flow rate based on stored tables. The above approach shows a look-up table of three variables. A method of reducing this to a table look-up of two variables is given below. The weight and time at each node is determined from:

$W(\theta_{i+1}, \phi_{i+1}) = W(\theta_{i+1}, \phi_{i+1}) + \Delta m_f$ $t(\theta_{i+1}, \phi_{i+1}) = t(\theta_{i+1}, \phi_{i+1}) + \Delta S/V$ Because the wind velocity is a function of altitude, and the optimum altitude depends on the wind, the determination of the optimal cruise requires the solution of a transcendental function. This function is solved by iteration. The iteration methods is:

1) Set wind speed $V_w$ to 0;
2) find cruising altitude $h_{cru}$, given CI and aircraft weight W;
3) find wind speed $V_w$, given $h_{cru}$;
4) repeat to find until the cruise altitude does not change $h_{cru}$ 3. Descent:

The cost increment for the descent is given by this integral:

$$\Delta C = \int_{S_1}^{S_2} \left[\frac{FFR + CI}{V}\right] ds$$

Approximations are made to simplify this integral. It is assumed that the descent from cruise is made instantaneously. An increment of fuel and time is added based on the distance and speed. This increment is calculated and stored as a function of aircraft weight.

$$\Delta C_{desc} = \Delta m_{fdesc}(W_{desc}) + CI \, \Delta T_{desc}$$

Wind Adjusted Cost Index—Vertical Path Solver

The cruise solution is a function of three parameters: (a) wind speed; (b) Cost Index (CI); and (c) aircraft weight (w). The cruise performance (fuel flow rate, speed, and altitude) may be stored as a function of these parameters, however, this requires storage of a large volume of data and three dimensional table look-up routines. A method to reduce the cruise performance cost from a three dimensional look-up to a two dimensional look-up is described. Following is a description of the method. The cost increment for the cruise to cruise transition is given by:

$$\Delta C = \left[\frac{FFR + CI}{V}\right] \Delta S$$

First, the control variables are chosen to minimize this function and to satisfy the cruise equilibrium conditions of thrust equals drag, and lift equals weight but with the wind equal to zero as follows:

$$\min_{h, V_a, \pi, C_L} \left[\frac{FFR(h, V, \pi) + CI}{V}\right]$$

subject to $T(h,V,\pi) - D(h,V,C_L) = 0$ $L(h,V,C_L) - W = 0$ $V_w = 0$

This optimization operation is computed off-line and the fuel flow rate, the cruise altitude and speed are stored as a function of the parameters weight (W) and cost index (CI). The tables that are stored include:

FFR=FFR(W,CI)

$h_{cru} = h_{cru}(W, CI)$ $V_{cru} = V_{cru}(W, CI)$

The procedure for including the wind effect is:

1) For the specified CI and the current aircraft weight, compute the "no wind" cost function increment using:

$$\Delta C = \frac{FFR(W, CI) + CI}{V(W, CI)}$$

2) Compute a "wind corrected" cost index CI'.

$$CI' = CI + \left(\frac{V_w V_T}{V_T + V_w}\right) \Delta C$$

3) Compute the wind cruise condition with the wind-adjusted cost index

FFR=FFR(W,CI')

$h_{cru} = h_{cru}(W, CI')$ $V_{cru} = V_{cru}(W, CI')$ $$\Delta C = \frac{FFR(W, CI') + CI'}{V_{cru}(W, CI')}$$

Section Four

Path Filtering

Figure 20:
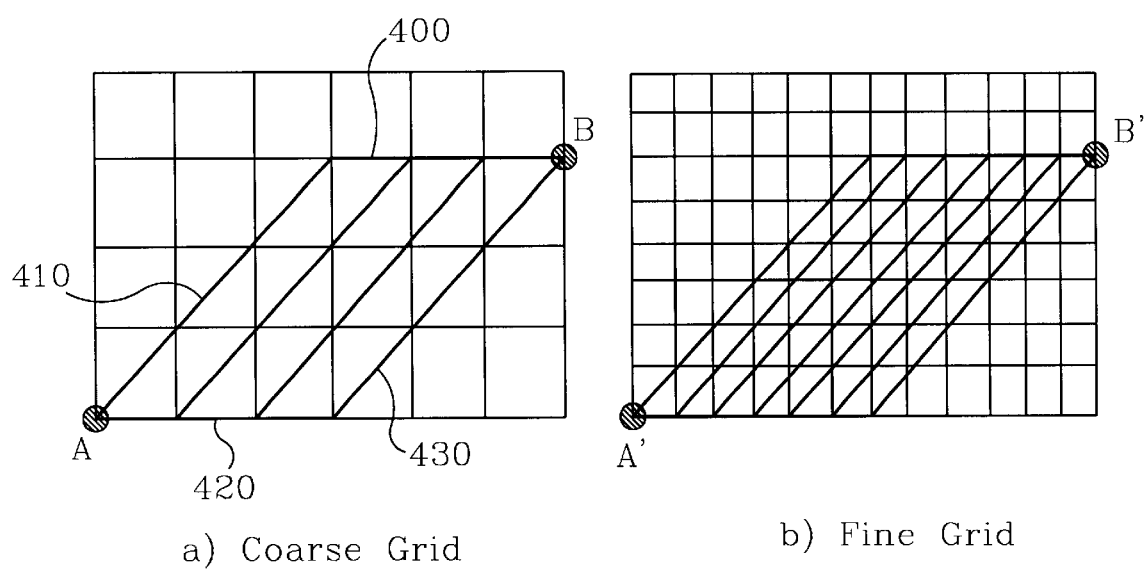
FIG. 20 is an illustration of quantization effects.

The state space quantization used in the dynamic programming method may lead to ambiguity in the solution, as illustrated in FIG. 20. In the example shown in FIG. 20, the cost function is the distance traveled between the nodes A and B. For purposes of this example only, it is assumed that the permissible turn directions of the departure segment at each node is 0°, +45° and −45° relative to the direction of the approach segment. This means that at each node, the aircraft is allowed to turn leftward or rightward 45° or continue straight. The region of ambiguity is defined by the outer boundary of the permissible routes as noted by labels 400, 410, 420 and 430. Within this boundary there are a number of paths having equal lengths. A reduction of the grid quantization does not reduce the region of ambiguity. With a finer grid, the path from A' to B' exhibits the same characteristics as above with regard to path A to B.

Figure 21:
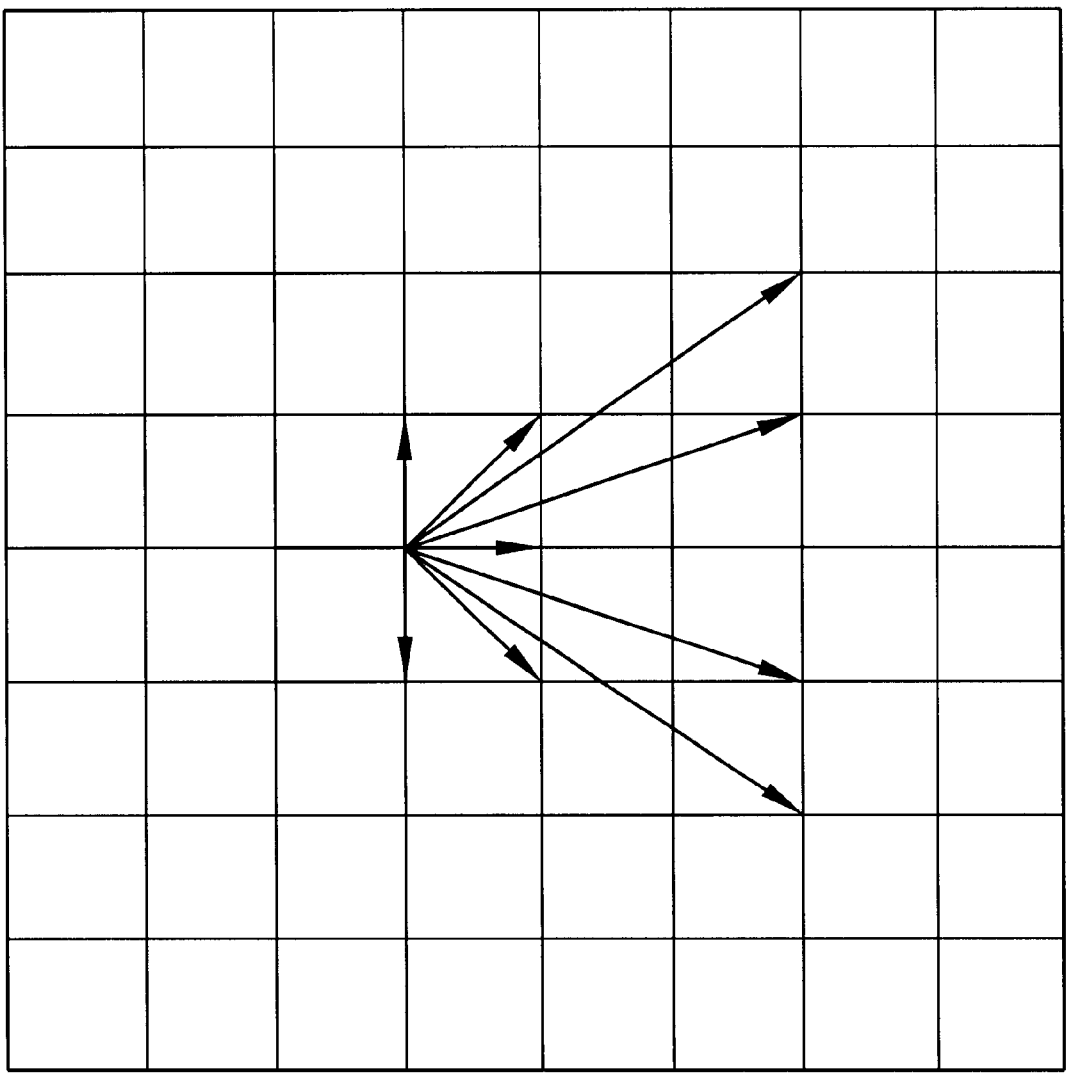
FIG. 21 is an illustration of departure segments at a node.

One solution is to provide more departure segments at each node. For this reason nine departure segments are specified, as shown in FIG. 21.

Figure 22:
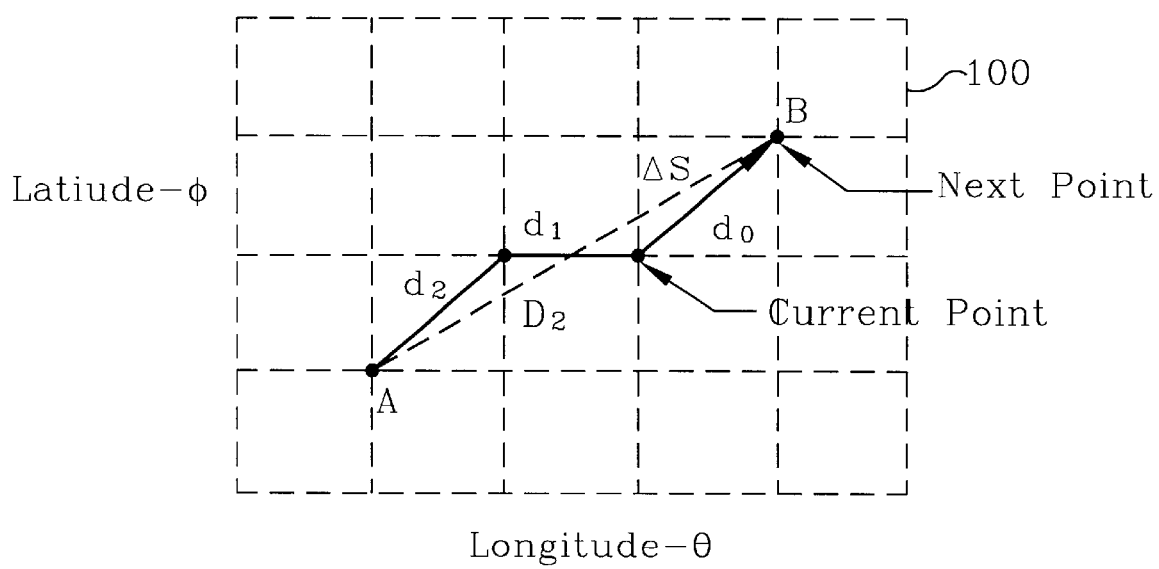
FIG. 22 is an illustration of path filtering.

Limiting the possible departure segments to nine does not reduce the ambiguity size to an acceptable level. To further reduce the ambiguity arising because of the quantization, a filter is used to smooth the route as it is generated. The filtering approach is shown in FIG. 22. FIG. 22 shows a grid 100 with an optimized path having three segments between node A and node B. The three segments are marked d0, d1, and d2.

Figure 23:
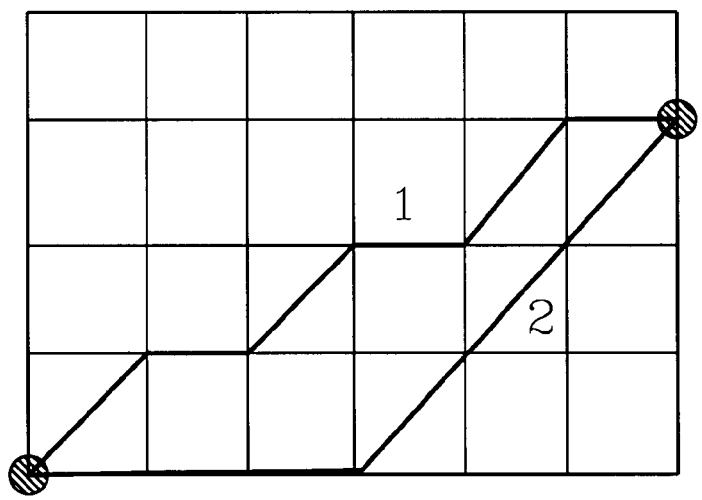
FIG. 23 is an illustration of the effect of filtering on route selection.

The filter equations are as follows:

$D_1 = d_0 + d_1 + d_2$ $\Delta D = D_1 - D_2$ $\Delta S = (d_0 - w_3 \Delta D)$ $w_3 = 0.4$ Thus, the arc length, $\Delta S$, for the current stage is shortened depending on the path shape defined by the previous two nodes. In FIG. 22, the filter would result in the selection of route 1 rather than route 2 as shown in FIG. 23. This is a desirable result because post-filtering of the routes would result in a shorter distance using route 1.

Filtering of the distance of the candidate routes results in a higher quality route. The filter minimizes the effect of the quantization in the lateral path.

Section Five

Computer System

Figure 24:
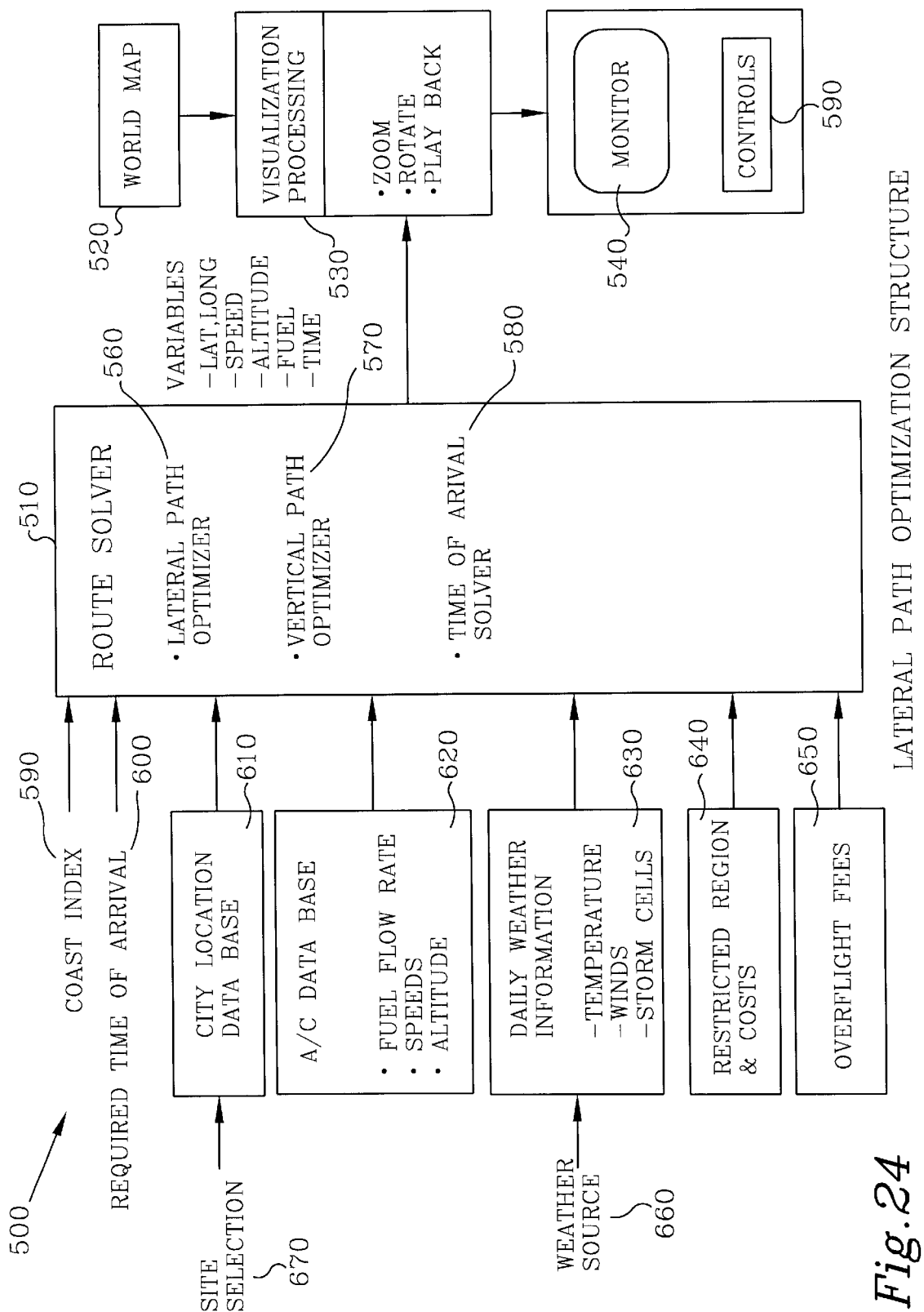
FIG. 24 is a block diagram illustrating implementation of one embodiment of the invention.

FIG. 24 illustrates a block diagram of one embodiment of the invention 500. Route Solver 510 includes lateral path optimizer 560, vertical path optimizer 570 and time of arrival solver 580. Route solver 510 receives inputs from a variety of sources. Cost index 590 is a function supplied to route solver 510. Required time of arrival 600 is user-specified and also supplied to route solver 510. The user provides a site selection 670 that is coordinated with the city location database 610 which is supplied to route solver 510. Aircraft database 620 is supplied to route solver 510 and includes information about fuel flow rates, speeds and altitude data. Weather information 630 may be derived from a variety of weather sources 660 and includes temperature, wind, and storm cell information. The weather information 630 is supplied to the route solver 510. Data corresponding to restricted regions and costs 640 is supplied to the route solver 510. Data corresponding to over-flight fees 650 is also supplied to route solver 510.

Route solver 510 generates the optimum route consistent with the user-specified parameters and conveys the solution to the display componentry. Monitor 540 is subject to control 550 and provides the means of displaying the route information. Monitor 540 derives data from the visualization processing module 530 which includes zoom, rotate and play-back features. The visualization processing module 530 receives data from route solver 510. The visualization processing module 530 receives also has available world map information 520.

The invention may be adapted to operate on numerous computer platforms, including such systems as Silicon Graphics Indigo2 R4000/4400 work station or personal computers running such operating systems as Windows 95 or Windows NT. In these embodiments, the user interfaces are functionally similar. In one embodiment, the user interface includes Windows pull-down menus. Alternatively, Motif menus, check boxes, slide bars or any other such operator control functions can be utilized. Various display and control functions may be accessible via pull-down menus. Display capabilities of the work station or personal computer are adapted to depict multiple routes, land and water areas as well overlay selected weather information. Selected weather may include winds exceeding a specified speed. In one embodiment, the disclosed subject matter includes encoding in a programming language such as FORTRAN or C.

Processing elements available to the computer for determining optimal routing includes the following:

1. Origin and destination locations:
   This data may include a city location database or latitude and longitudinal coordinates. A user may input this data manually or make a selection from menus. Alternatively, a user may make a selection using a pointer and a map.
2. Vertical motion model:
   This data provides a model of the aircraft operating performance.
3. Weather database:
   This data may include daily or hourly weather reports. Data may be measured or forecasted weather and includes global data bases depicting atmospheric, wind, weather, and temperature profiles as well as hazardous weather.
4. Vertical path solver:
   Algorithms, routines, and data necessary for determining optimal vertical path routing based on selected parameters. This function may be implemented as a look-up table or include arithmetic functions for optimizing the path.
5. Lateral (horizontal) path solver:
   This includes the dynamic programming model as explained below.
6. Visualization graphics:
   Drivers and conversion functions to display the calculated path in conjunction with reference data such as maps and global displays.
7. Cost Index model:
   This model provides the operating parameters of the aircraft, or other vehicle. Aircraft modeling is a function of aircraft and engine performance data, including fuel flow rates.
8. Geographical model:
   This model provides the data used in depicting the globe and map.
   Political and geographical data are also included.

Computer Programming

In addition to the route-planning component of the programming, additional elements provide a graphical user interface (or "GUI") and a graphics-hardware interface.

A) In one embodiment, the GUI includes modules that provides the visual appearance of the application and provide overall program control. These modules may be encoded in Motif-based C (for Silicon Graphics applications) or Microsoft Windows Visual C/C++ (for PC applications) or other such language.

B) In one embodiment, the graphics-hardware interface module may be written in C using Open GL graphics libraries to render three-dimensional displays. This module computes viewing perspectives, displays the globe, and draws path data on the display surface.

C) In one embodiment, the route-planning component computes minimum time and minimum fuel routes between selected locations using optimization algorithms. Optimization may be performed on either the lateral plane, the vertical plane, or both planes. Suitable global databases characterizing such data as land and water areas, atmospheric, wind and temperature profiles are utilized by the route-planning component. In one embodiment, this function is written in FORTRAN and C.

Controls and Features

In one embodiment, the user interface features Windows-type pull-down menus. Menu selections enable route generation and user-control of functions such as earth perspective, rotation and zoom. Other controls allow the user to save the current route or display previously-saved routes. Other maps, including wind contour maps and land maps, may be overlaid atop the resulting routes via user-controlled check boxes and menus. Short-cut keyboard controls duplicate some of the pull-down menu functionality.

City Location Database

In one embodiment, the user is presented with various options for selecting origin and destination locations. Various options for identifying locations include, but are not limited to, pointing and clicking an icon on a map, or entering latitude and longitude coordinates, or selecting city names, or selecting from a database of locations. Such a database may consist of entries as shown below:

| Number | Latitude | Longitude | City |
|---|---|---|---|
| 1 | 61.17 | −149.97 | Anchorage |
| 2 | 13.00 | 100.00 | Bangkok |
| 3 | 18.94 | 72.83 | Bombay (Mumbai) |
| 4 | 30.00 | 31.00 | Cairo |
| 5 | 41.80 | −87.63 | Chicago |
| 6 | 32.70 | −96.70 | Dallas |
| 7 | 28.63 | 77.20 | Delhi |
| 8 | 22.00 | 114.00 | Hong Kong |
| 9 | 21.30 | −157.85 | Honolulu |
| 10 | −26.17 | 28.03 | Johannesburg |
| 11 | 51.00 | 7.00 | Cologne |
| 12 | 34.05 | −118.23 | Los Angeles |
| 13 | 51.50 | 0.10 | London |
| 14 | 19.33 | −99.17 | Mexico City |
| 15 | 25.77 | −80.18 | Miami |
| 16 | 45.00 | −93.00 | Minneapolis |
| 17 | 55.75 | 37.70 | Moscow |
| 18 | 40.70 | −74.00 | New York |
| 19 | 48.83 | 2.33 | Paris |
| 20 | 33.50 | −112.17 | Phoenix |
| 21 | −22.88 | −43.22 | Rio de Janeiro |
| 22 | 42.00 | 12.00 | Rome |
| 23 | 37.77 | −122.40 | San Francisco |
| 24 | 47.60 | −122.33 | Seattle |
| 25 | 31.00 | 121.00 | Shanghai |
| 26 | 1.30 | 103.90 | Singapore |
| 27 | −33.87 | 151.20 | Sydney |
| 28 | 17.48 | −149.45 | Tahiti |
| 29 | 35.75 | 139.75 | Tokyo |
| 30 | 47.00 | 8.00 | Zurich |

Wind Temperature Data Base

This data may include daily or hourly weather reports. Data may be measured or forecasted weather and includes global data bases depicting atmospheric, wind, weather, and temperature profiles including hazardous weather. Wind data includes wind speed and direction as a function of latitude, longitude and altitude. Temperature profiles provide temperature data also, as a function of latitude, longitude and altitude. Such profiles are commercially available at six and twelve hour update intervals. One such service, the National Weather Service, provides data in gridded binary format (GRIB) at 1.25° by 1.25° updated twice daily. FIG. 8 depicts a global view of such wind data.

Conclusion

Systems and methods have been described for optimizing aircraft routing. The systems and methods are based on weather and atmospheric information, geographic regions and airspace regions, over-flight fees and required arrival time to generate an optimal route. Although specific embodiments have been illustrated and described herein, it will be appreciated by those of ordinary skill in the art that any arrangement which is calculated to achieve the same purpose may be substituted for the specific embodiments shown. Many adaptations of the invention will be apparent to those of ordinary skill in the art. As an example, values chosen for the number of generated departure paths from particular nodes, as well as the grid selection, configuration and coordinate system are based upon good operational judgment, and changes may be made, due to differences in judgment or equipment performance, without departing from the scope herein. Accordingly, this application is intended to cover any adaptations or variations of the invention. It is manifestly intended that this invention be limited only by the following claims and equivalents thereof.

What is claimed is:

1. A method of determining a route between an origin and a destination comprising:

beginning at the origin, determining multiple feasible segments from the origin to a node at the end of each feasible segment wherein at least one segment is not directed toward the destination;

iteratively determining further segments from the nodes to create multiple segment paths between the origin and the destination; and determining the segment path between the origin and destination having the least cost.

2. The method of claim 1 wherein the determination of least cost is a function of weather conditions.

3. The method of claim 1 wherein the determination of least cost is a function of time.

4. The method of claim 1 wherein up to three feasible segments are determined from each node.

5. The method of claim 1 wherein up to nine feasible segments are determined from each node.

6. The method of claim 1 wherein the segments are constrained to lie within a grid logically constructed to contain the origin and destination.

7. The method of claim 6 wherein the nodes are uniformly dispersed within the grid, and the segments are defined to span between selected nodes.

8. The method of claim 1 wherein determining the segment path between the origin and destination having the least cost comprises evaluating a cost function.

9. The method of claim 1 wherein determining the segment path between the origin and destination having the least cost comprises minimizing a cost function.

10. The method of claim 1 wherein determining the segment path between the origin and destination having the least cost comprises minimizing a weighted cost function.

11. The method of claim 1 wherein determining the segment path between the origin and destination having the least cost comprises minimizing a weighted cost function, and further comprising establishing a weight for a term of the weighted cost function.

12. The method of claim 1 wherein each segment path has a heading, and further comprising filtering to minimize the number of segment path heading changes.

13. The method of claim 1 wherein each segment path has a length, and further comprising filtering to reduce the length of the segment path.

14. A method of selecting a flight path from an origin to a destination, the method comprising:

defining a plurality of nodes in a lateral plane, wherein the plurality of nodes comprises the origin and destination;

generating a plurality of possible lateral flight paths from the origin to the destination, wherein the plurality of possible lateral flight paths comprise segments, further wherein each of the segments connects two of the plurality of nodes;

generating an optimized lateral flight path, wherein the optimized lateral flight path is one flight path of the plurality of possible lateral flight paths that satisfies a desired optimization criteria, further wherein the desired optimization criteria comprises at least one criteria selected from the group consisting of wind-optimization, region avoidance, over-flight fee minimization and required time of arrival; and filtering the optimized lateral flight path while it is being generated.

15. The method of claim 14 further comprising generating an optimized vertical flight path from the origin to the destination, wherein the optimized vertical flight path is a function of predetermined parameters, further wherein the predetermined parameters include aircraft weight, wind speed and a cost index.

16. The method of claim 15 further comprising selecting the filtered optimized lateral flight path and the optimized vertical flight path as the flight path.

17. The method of claim 14 wherein filtering the optimized lateral flight path while it is being generated comprises reducing the length of the optimized lateral flight path as a function of the distances between a set of nodes.

18. The method of claim 14 wherein generating an optimized lateral flight path comprises determining the cost, as a function of the direction of approach, associated with transit to selected nodes.

19. The method of claim 14 wherein defining a plurality of nodes in a lateral plane comprises defining nodes in a geometrically ordered arrangement.

20. The method of claim 14, wherein generating an optimized lateral flight path comprises accessing data selected from the group consisting of atmospheric data, wind field data, restricted airspace data and over-flight fee data.

21. The method of claim 14, further comprising displaying the filtered optimized lateral flight path on a visual display.

22. The method of claim 14 further comprising generating an optimized vertical flight path between the origin and the destination using a generalized optimization technique on predetermined data.

23. The method of claim 14 further comprising generating an optimized vertical flight path between the origin and the destination using a calculation of variations method on predetermined data.

24. The method of claim 14 further comprising generating an optimized vertical flight path between the origin and destination using predetermined data, the predetermined data comprising wind speed, weight and a cost index.

25. The method of claim 14 wherein filtering comprises minimizing the number of flight path heading changes.

26. The method of claim 14 wherein filtering comprises reducing the length of the flight path.

27. A computer-implemented method of selecting an optimized flight path from an origin location to a destination location, such that the selected flight path satisfies specified optimization criteria, the method comprising:

defining a grid that encompasses the location of origin and the location of destination, wherein the grid comprises a plurality of nodes of which the origin and destination are nodes therein;

generating a lateral flight path by selecting a set of nodes, such that the selected set of nodes satisfies the optimization criteria;

generating a vertical flight path within the grid as a function of wind speed, weight of an aircraft operated on the flight path and a cost index;

adjusting the lateral flight path while generating the lateral flight path to reduce the length of the lateral flight path; and selecting the adjusted lateral flight path and the vertical flight path as the flight path.

28. The method of claim 27 wherein generating a lateral flight path by selecting a set of nodes that satisfies the optimization criteria comprises generating a lateral flight path by selecting a set of nodes that substantially satisfies a criteria selected from the group consisting of minimizing a cost function, minimizing the fuel consumed by the aircraft, minimizing the time en route, minimizing over-flight fees associated with specified airspace, avoiding a specified region, and satisfying a required time of arrival.

29. The method of claim 27 wherein the grid includes a plurality of uniformly spaced nodes and generating a lateral flight path includes evaluating the optimization criteria at selected nodes.

30. The method of claim 27 wherein generating a lateral flight path by selecting a set of nodes, such that the selected set of nodes satisfies the optimization criteria includes accessing data selected from the group consisting of atmospheric data, wind field data, restricted airspace data and over-flight fee data.

31. A flight path optimizing system for selecting an optimal flight path, that satisfies specified criteria, from an origin location to a destination location, the system comprising:

a location database, wherein the contents of the location database corresponds to locations of origin and destination;

a data file, wherein the contents of the data file comprises data corresponding to the location database and the contents of the data file corresponds to data selected from the group consisting of atmospheric data, wind field data, restricted airspace data and over-flight fee data;

a vehicle model file, wherein the contents of the vehicle model file corresponds to data representative of fuel flow rates and vehicle performance;

a lateral path solver, wherein the lateral path solver includes programming to cause the system to search a lateral region for a lateral path that satisfies the specified criteria;

a vertical path solver, wherein the vertical path solver includes stored data representative of fuel flow rate, altitude and vehicle speed as a function of vehicle weight, wind speed and cost index; and a display member to display the lateral path and vertical path.

32. The system of claim 31 further including a filter wherein the filter reduces the length of the lateral path.

33. The system of claim 31 wherein the wind field data comprises wind speed at a specified location and altitude.

34. The system of claim 31 wherein the vehicle is an aircraft.

35. A method of determining a route, comprising:

receiving an origin node;

receiving a destination node, the destination node located a distance from the origin node;

creating a grid comprising the origin node, the destination node, and a plurality of en route nodes;

determining the cost to transition to the destination node and each of the plurality of en route nodes including transitions to nodes not directed toward the destination node; and selecting a subset of nodes from the plurality of en route nodes, the subset of nodes having the least total cost to transition from the origin node to the destination node.

36. The method of claim 35 wherein receiving an origin node comprises receiving an origin node expressed in global coordinates and receiving a destination node comprises receiving a destination node expressed in global coordinates, and further comprising:
  transforming the global coordinates of the origin node into a coordinate system wherein the origin lies on an equator; and
  transforming the global coordinates of the destination node into a coordinate system wherein the destination lies on the equator.

37. The method of claim 35 wherein receiving an origin node comprises receiving a user-selected origin node and receiving a destination node comprises receiving a user-selected destination node.

38. The method of claim 35 wherein determining the cost to transition comprises evaluating a cost function.

39. The method of claim 35 wherein determining the cost to transition comprises evaluating a user-specified cost function.

40. The method of claim 35 further comprising receiving a weighting factor for a cost function and wherein determining the cost to transition comprises evaluating the cost function.

41. The method of claim 35 further comprising receiving a user-specified weighting factor for a cost function and wherein determining the cost to transition comprises evaluating the cost function.

42. The method of claim 35 wherein determining the cost to transition comprises evaluating a cost function, the cost function comprising a factor for fuel.

43. The method of claim 35 wherein determining the cost to transition comprises evaluating a cost function, the cost function comprising a factor for time.

44. The method of claim 35 wherein determining the cost to transition comprises evaluating a cost function, the cost function comprising a factor for over-flight fees.

45. The method of claim 35 wherein determining the cost to transition comprises evaluating a cost function, the cost function comprising a factor for hazard costs.

46. The method of claim 35 further comprising displaying the route on a map.

47. The method of claim 35 further comprising determining the time of arrival at the destination node and each of the plurality of en route nodes, and selecting a subset of nodes comprises selecting a subset of nodes yielding a desired time of arrival at the destination node.

48. The method of claim 35 wherein determining the cost to transition to the destination node and each of the plurality of en route nodes comprises accessing wind information associated with the destination node and each of the plurality of en route nodes.

49. The method of claim 35 wherein determining the cost to transition to the destination node and each of the plurality of en route nodes comprises accessing over-flight fee information associated with each of the plurality of en route nodes.

50. The method of claim 35 wherein determining the cost to transition to the destination node and each of the plurality of en route nodes comprises accessing at least one of airspace classification information, weather information, political information, and environmental information associated with each of the plurality of en route nodes.

51. The method of claim 50 further comprising displaying at least one of the route and airspace classification information, weather information, political information, and environmental information on a map.

52. The method of claim 35 wherein selecting a subset of nodes from the plurality of en route nodes comprises iteratively calculating the cost to transition from each node to each of a plurality of subsequent nodes.

53. The method of claim 35 further comprising receiving a vehicle performance model and wherein determining the cost to transition to the destination node and each of the plurality of en route nodes comprises accessing the vehicle performance model.

54. A method of determining a route, comprising:
  receiving an origin node;
  receiving a destination node, the destination node remote from the origin node;
  selecting a plurality of intermediate nodes; each of the plurality of intermediate nodes remote from the origin node and the destination node, and each of the plurality of nodes lying on one or more non directed routes between the origin node and the destination node;
  determining a transition cost for each of the plurality of intermediate nodes and the destination node; and
  selecting a route from the one or more routes, the route selected having the lowest transition cost.

55. The method of claim 54 wherein determining a transition cost for each of the plurality of intermediate nodes and the destination node comprises determining transition costs as a function of arrival direction for each of the plurality of intermediate nodes and the destination node.

56. The method of claim 54 wherein determining a transition cost for each of the plurality of intermediate nodes and the destination node comprises determining transition costs as a function of departure direction for each of the plurality of intermediate nodes and the origin node.

57. The method of claim 54 wherein determining a transition cost for each of the plurality of intermediate nodes and the destination node comprises determining transition costs for each of the plurality of intermediate nodes and the destination node using an iterative calculation process.

58. The method of claim 54 wherein determining a transition cost for each of the plurality of intermediate nodes and the destination node comprises identifying a subset of the plurality of intermediate nodes and the destination node as active and determining transition costs as a function of arrival direction for each of the active nodes.

59. The method of claim 54 wherein the transition cost associated with a node is a function of one of the location of the node and a function of the weather at a node.

60. The method of claim 54 wherein the transition cost associated with a node is a function of an overflight fee associated with the node.

61. The method of claim 54 further comprising selecting a vertical path as a function of wind speed, wind direction, vehicle weight and a cost index.

62. The method of claim 54 further comprising smoothing the selected route.

63. The method of claim 54 further comprising displaying the selected route on a monitor.

64. A method of selecting a lateral route, comprising:
  receiving an origin node;
  receiving a destination node, the destination node remote from the origin node;
  defining a plurality of paths, each path originating at the origin node and terminating at the destination node and traversing one or more intermediate nodes, wherein at least a portion of the non directed path is not directed toward the destination;
  determining the cost associated with traversing each of the plurality of paths; and
  selecting the path that satisfies a predetermined cost function.

65. The method of claim 64 wherein defining a plurality of paths comprises defining a plurality of intermediate nodes.

66. The method of claim 64 wherein determining the cost associated with traversing each of the plurality of paths comprises iteratively calculating costs associated with each intermediate node.

67. The method of claim 64 wherein selecting the path that satisfies a predetermined cost function comprises selecting the path having the least cost of arriving at the destination node.

68. The method of claim 64 wherein selecting the path that satisfies a predetermined cost function comprises selecting the path that satisfies a required time of arrival at the destination node.

69. The method of claim 64 wherein selecting the path that satisfies a predetermined cost function comprises selecting the path that satisfies a required time of arrival at the destination node, wherein satisfaction of the required time of arrival comprises iteratively adjusting the cost function.

70. The method of claim 69 wherein iteratively adjusting the cost function comprises adjusting a weight factor for time.

71. The method of claim 64 further comprising selecting a vertical path as a function of aircraft weight, wind conditions associated with each intermediate node, and a cost index.

72. The method of claim 64 wherein selecting the path that satisfies a predetermined cost function comprises evaluating the predetermined cost function for each intermediate node.

73. The method of claim 64 wherein the predetermined cost function comprises a weighted term and wherein selecting the path that satisfies a predetermined cost function comprises establishing a weight for a term in the predetermined cost function.

74. A method of determining a route between an origin and a destination for a vehicle taking into account variables as it moves along the route, the method comprising:

establishing a plurality of nodes in a grid encompassing the origin and destination;

beginning at the origin node, determining costs of moving the vehicle to multiple nodes in a non directed manner proximate to the origin node;

from each of the multiple nodes, determining transition costs of moving to further multiple nodes as a function of the variables; and repeatedly determining further costs from the nodes to create multiple routes between the origin and the destination.

75. The method of claim 74 and further including tracking the total cost from the origin to each of the nodes for which a cost is determined from a previous node.

76. The method of claim 75 and further including repeating the determination of costs to move to further nodes from a node previously reached only if the total cost to reach the node is less than the previous total cost to reach the node.

* * * * *